(12) United States Patent
Seo et al.

(10) Patent No.: US 12,511,706 B2
(45) Date of Patent: Dec. 30, 2025

(54) ELECTRONIC DEVICE FOR ADAPTIVELY DISPLAYING IMAGE, AND OPERATION METHOD OF THE ELECTRONIC DEVICE

(71) Applicant: SAMSUNG ELECTRONICS CO., LTD., Suwon-si (KR)

(72) Inventors: Yoojin Seo, Suwon-si (KR); Myungjae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 209 days.

(21) Appl. No.: 18/096,963

(22) Filed: Jan. 13, 2023

(65) Prior Publication Data

US 2023/0162321 A1 May 25, 2023

Related U.S. Application Data

(63) Continuation of application No. PCT/KR2022/018308, filed on Nov. 18, 2022.

(30) Foreign Application Priority Data

Nov. 19, 2021 (KR) .................. 10-2021-0160715

(51) Int. Cl.
 *G06T 3/40* (2024.01)
(52) U.S. Cl.
 CPC ..................... *G06T 3/40* (2013.01)
(58) Field of Classification Search
 CPC .................................................. G06T 3/40
 See application file for complete search history.

(56) References Cited

U.S. PATENT DOCUMENTS 7,656,399 B2 2/2010 Ono
9,041,826 B2 5/2015 Jung et al.
(Continued)

FOREIGN PATENT DOCUMENTS

CN 107393459 A * 11/2017 ............ G09G 3/20
JP 2008-53813 A 3/2008
(Continued)

OTHER PUBLICATIONS

International Search Report and Written Opinion (PCT/ISA/210, PCT/ISA/220, and PCT/ISA/237) issued by the International Searching Authority on Feb. 20, 2023 in corresponding International Application No. PCT/KR2022/018308.
(Continued)

*Primary Examiner* — Yu Chen
(74) *Attorney, Agent, or Firm* — Sughrue Mion, PLLC

(57) ABSTRACT

A method, performed by an electronic device, includes identifying that a screen display mode of the electronic device currently displaying a first image is changed from a first display mode to a second display mode, the screen display mode being one of a landscape mode and a portrait mode, identifying whether a blank exists on a screen of the electronic device, when the first image is displayed in the second display mode, based on identifying the blank exists, detecting one or more objects from the first image, generating candidate images by cropping a region that includes one or more of the one or more objects, selecting a second image from the plurality of candidate images, and displaying the second image so that the blank does not exist on the screen of the electronic device in the second display mode.

20 Claims, 17 Drawing Sheets

(56) References Cited

U.S. PATENT DOCUMENTS

| | | | |
|---|---|---|---|
| 9,547,425 B2 | 1/2017 | Wilson et al. | |
| 10,929,979 B1* | 2/2021 | Dimson | H04N 21/431 |
| 11,379,175 B2 | 7/2022 | Lim et al. | |
| 2007/0268394 A1 | 11/2007 | Nonaka et al. | |
| 2014/0022265 A1* | 1/2014 | Canan | G06V 20/30 |
| | | | 345/522 |
| 2016/0042251 A1* | 2/2016 | Cordova-Diba | G06F 16/583 |
| | | | 382/199 |
| 2016/0357406 A1* | 12/2016 | Lee | G06V 10/17 |
| 2017/0134631 A1* | 5/2017 | Zhao | G06T 7/20 |
| 2017/0269815 A1* | 9/2017 | Da Silva Ramos | |
| | | | G06F 3/04817 |
| 2018/0006762 A1* | 1/2018 | Yang | H04N 21/6582 |
| 2018/0115741 A1* | 4/2018 | Greene | H04N 21/4755 |
| 2018/0352191 A1* | 12/2018 | Eppolito | G09G 5/024 |
| 2019/0012129 A1* | 1/2019 | Han | H04N 21/44218 |
| 2020/0050862 A1 | 2/2020 | Wexler et al. | |
| 2020/0210766 A1* | 7/2020 | Lim | H04N 21/4318 |
| 2020/0293255 A1* | 9/2020 | Lim | G09G 3/2092 |
| 2020/0310738 A1* | 10/2020 | Lee | G09G 5/005 |
| 2020/0387702 A1* | 12/2020 | Pribble | G06V 20/20 |
| 2021/0021900 A1* | 1/2021 | Kansara | H04N 21/4318 |
| 2022/0326899 A1* | 10/2022 | Mikawa | G09G 5/005 |
| 2023/0110543 A1 | 4/2023 | Lee et al. | |

FOREIGN PATENT DOCUMENTS

| | | |
|---|---|---|
| JP | 2010-87955 A | 4/2010 |
| JP | 5614835 B2 | 10/2014 |
| KR | 10-2014-0105308 A | 9/2014 |
| KR | 10-2015-0034724 A | 4/2015 |
| KR | 10-2019-0006221 A | 1/2019 |
| KR | 10-2019-0053619 A | 5/2019 |
| KR | 10-2020-0108760 A | 9/2020 |
| KR | 10-2021-0046085 A | 4/2021 |
| KR | 10-2022-0003378 A | 1/2022 |
| WO | 2021/206391 A1 | 10/2021 |

OTHER PUBLICATIONS

Extended European Search Report dated Nov. 4, 2024, issued by the European Searching Authority in European Application No. 22896133.0.

* cited by examiner

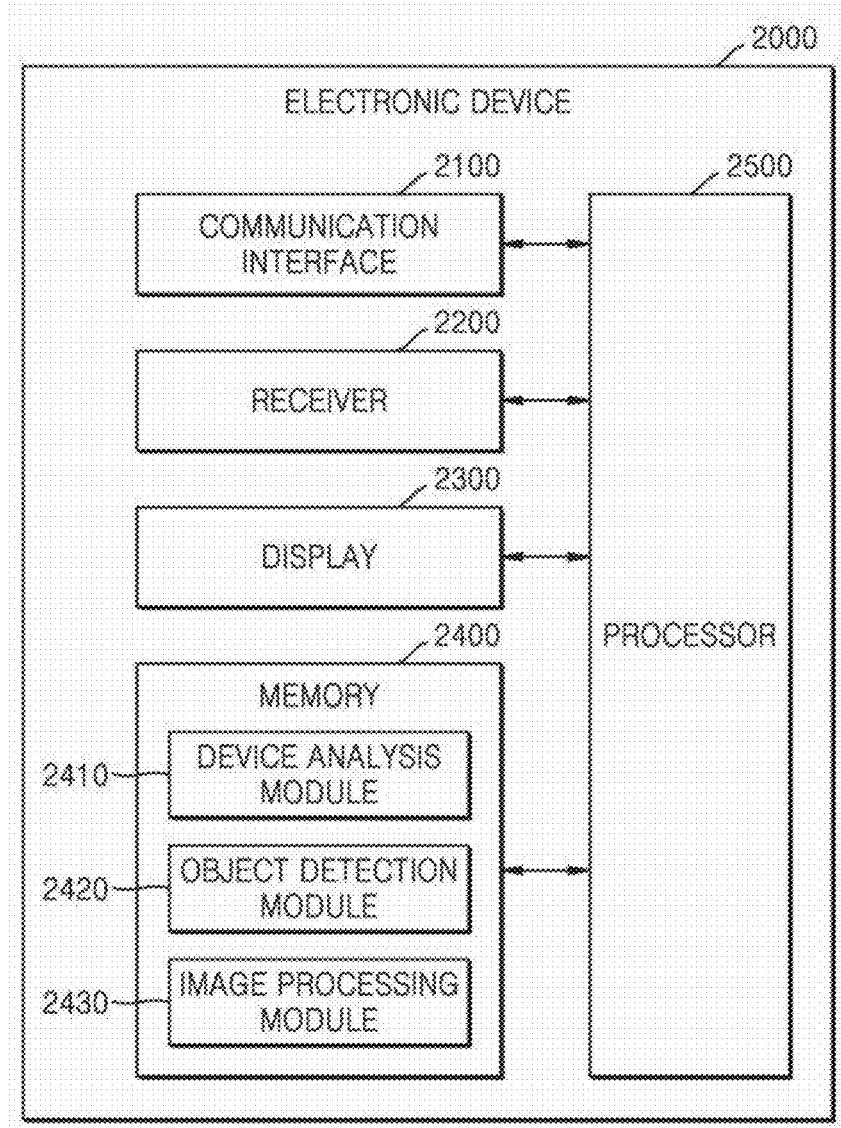

ELECTRONIC DEVICE FOR ADAPTIVELY DISPLAYING IMAGE, AND OPERATION METHOD OF THE ELECTRONIC DEVICE

CROSS-REFERENCE TO RELATED APPLICATIONS

This application is a continuation application of International Application No. PCT/KR2022/018308, filed on Nov. 18, 2022, in the Korean Intellectual Property Office, which is based on and claims priority to Korean Patent Application No. 10-2021-0160715, filed on Nov. 19, 2021, in the Korean Intellectual Property Office, the disclosures of each of which being incorporated by reference herein in their entireties.

BACKGROUND

1. Field

The disclosure relates to an electronic device for adaptively displaying an image, and an operation method of the electronic device.

2. Description of Related Art

In order to provide a better visual experience through a display in an electronic device, a changeable screen display mode is provided. For example, an electronic device provides a landscape mode for displaying an image of a horizontal resolution and a portrait mode for displaying an image of a vertical resolution. When the image of the horizontal resolution is displayed in the portrait mode or the image of the vertical resolution is displayed, a blank is generated on the top and bottom or left and right sides of the electronic device due to a difference in resolution.

SUMMARY

Provided is a method, performed by an electronic device, of adaptively displaying an image processed from user's content currently being displayed by the electronic device as a screen display mode is changed.

Provided are an electronic device for adaptively displaying an image by identifying a change in a screen display mode of the electronic device and displaying a new image generated by processing an image currently being displayed in a previous screen display mode when user's content is displayed in the changed screen display mode, and an operation method of the electronic device.

In accordance with an aspect of the disclosure, a method, performed by an electronic device, may include identifying that a screen display mode of the electronic device currently displaying a first image is changed from a first display mode to a second display mode, the screen display mode being one of a landscape mode and a portrait mode; identifying whether a blank exists on a screen of the electronic device, when the first image is displayed in the second display mode; based on identifying the blank exists, detecting one or more objects from the first image; generating a plurality of candidate images by cropping a region that includes one or more of the one or more objects; selecting a second image from the plurality of candidate images; and displaying the second image so that the blank does not exist on the screen of the electronic device in the second display mode.

In accordance with another aspect of the disclosure, an electronic device may include a display, a memory that stores one or more instructions, and a processor configured to execute the one or more instructions that are stored in the memory to cause the processor to identify that a screen display mode of the electronic device currently displaying a first image is changed from a first display mode to a second display mode, the screen display mode being one of a landscape mode and a portrait mode; identify whether a blank exists on a screen of the electronic device, when the first image is displayed in the second display mode; based on identifying that the blank exists, detect one or more objects from the first image; generate a plurality of candidate images by cropping a region that includes one or more of the one or more objects; select a second image from the plurality of candidate images; and display the second image so that the blank does not exist on the screen of the electronic device in the second display mode.

In accordance with an aspect of the disclosure, a computer-readable recording medium having recorded thereon a program for executing methods, performed by the above-described electronic device, of adaptively displaying an image may be provided.

BRIEF DESCRIPTION OF DRAWINGS

The above and other aspects, features, and advantages of certain embodiments of the present disclosure will be more apparent from the following description taken in conjunction with the accompanying drawings, in which:

FIG. 15 is a block diagram of an electronic device according to an embodiment.

DETAILED DESCRIPTION

Figure 1:
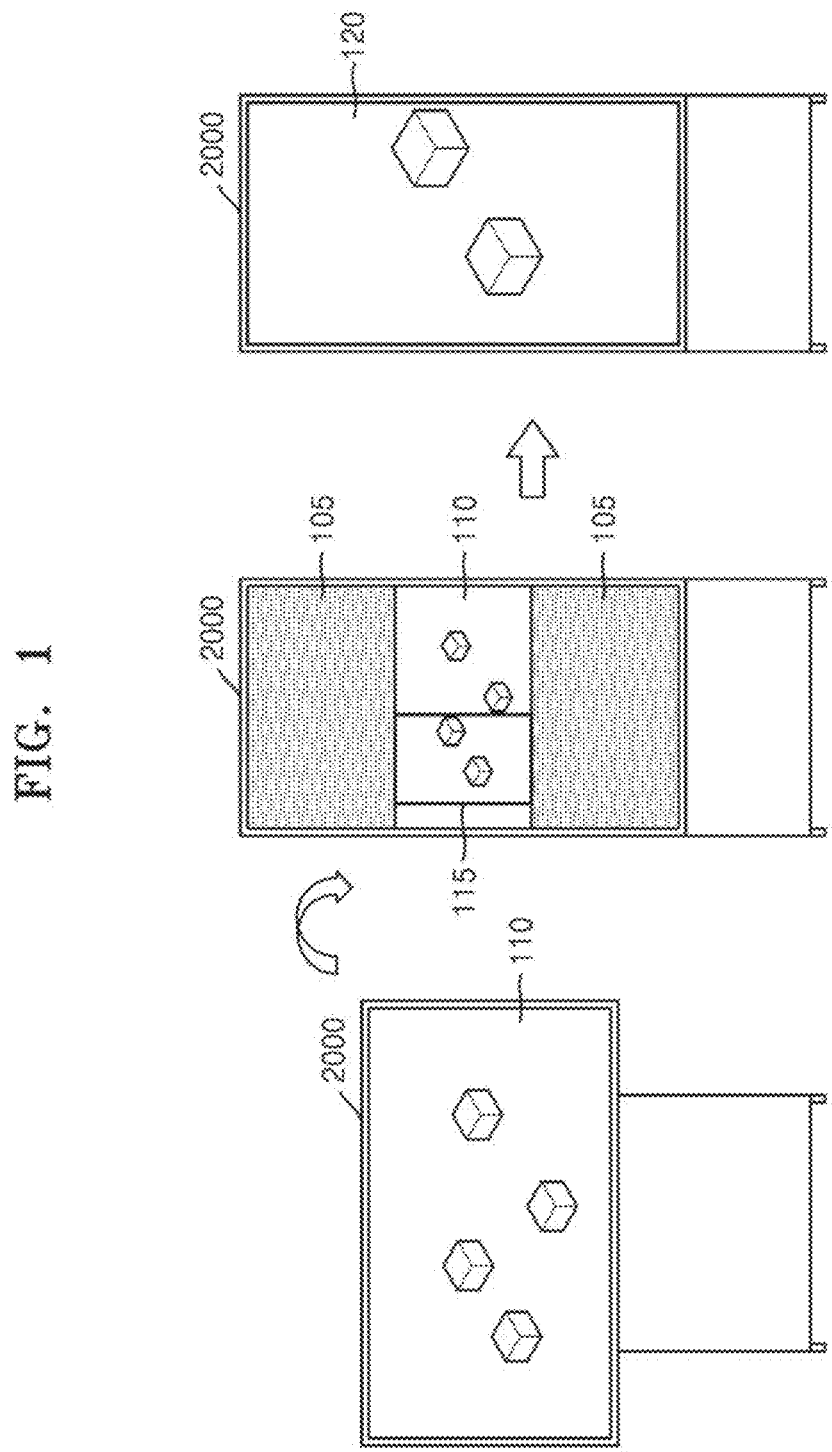
FIG. 1 is a view for schematically explaining a method of displaying an image, according to an embodiment.

Throughout the disclosure, the expression "at least one of a, b or c" indicates only a, only b, only c, both a and b, both a and c, both b and c, all of a, b, and c, or variations thereof.

Terms used herein will be described briefly, and the disclosure will be described in detail.

Although general terms widely used at present were selected for describing the disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs. While such terms as "first", "second", etc., may be used to describe various components, such components must not be limited to the above terms. The above terms are used only to distinguish one component from another.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiment set forth herein. In the drawings, parts irrelevant to the description are omitted for the simplicity of explanation, and like numbers refer to like elements throughout.

An electronic device is provided for adaptively displaying an image by identifying a change in a screen display mode of the electronic device and displaying a new image generated by processing an image currently being displayed in a previous screen display mode when user's content is displayed in the changed screen display mode. An operation method of the electronic device is also provided.

According to some embodiments, a method, performed by an electronic device, of adaptively displaying an image may include identifying that a screen display mode of the electronic device currently displaying a first image is changed, wherein the screen display mode is one of a landscape mode and a portrait mode, identifying whether a blank exists on a screen of the electronic device, when the first image is displayed in the changed screen display mode, upon identifying that there is the blank on the screen of the electronic device, detecting one or more objects from the first image, generating a plurality of cropped candidate images by cropping a region including each of the one or more objects, selecting a second image from the plurality of candidate images, and displaying the second image so that the blank does not exist on the screen of the electronic device in the changed screen display mode.

According to some embodiments, the selecting of the second image may include selecting a plurality of second images from the plurality of candidate images, and the displaying of the second image may include displaying one of combinations of the plurality of second images.

According to some embodiments, the selecting of the second image may include selecting a plurality of second images from the plurality of candidate images, and the displaying of the second image may include sequentially displaying the plurality of second images.

According to some embodiments, the method may further include adjusting the size of the second image and improving resolution.

According to some embodiments, the detecting of the one or more objects from the first image may include generating a region of interest (ROI) map indicating ROIs within the first image; and recognizing the one or more objects, based on the ROI map.

According to some embodiments, when the recognized one or more objects are a plurality of objects, the method may further include classifying the plurality of objects into a main object and sub-objects. The selecting of the second image may include selecting a candidate image including the main object as the second image.

According to some embodiments, the generating of the plurality of candidate images may include cropping a region including each of the one or more objects so that an aspect ratio of a crop region is a certain ratio, based on specifications of the electronic device.

According to some embodiments, the generating of the plurality of candidate images may further include determining a crop region corresponding to each of the one or more objects, based on at least some of the location of an object within the first image, the number of objects within the first image, and presence or absence of the object.

According to some embodiments, the determining of the crop region may include determining a larger crop region to further include an extra region of a certain size, based on each of the one or more objects, and the displaying of the second image may include displaying the second image including the extra region so that the location of the object displayed on the screen of the electronic device moves.

According to some embodiments, the method may further include displaying the first image on the screen of the electronic device, when the screen display mode of the electronic device is changed back to a previous screen display mode after the second image is displayed.

According to some embodiments, an electronic device for adaptively displaying an image may include a display, a memory storing one or more instructions, and a processor configured to execute the one or more instruction stored in the memory. The processor may be configured to execute the one or more instructions to identify that a screen display mode of the electronic device currently displaying a first image is changed, wherein the screen display mode is one of a landscape mode and a portrait mode, identify whether a blank exists on a screen of the electronic device, when the first image is displayed in the changed screen display mode, upon identifying that there is the blank on the screen of the electronic device, detect one or more objects from the first image, generate a plurality of cropped candidate images by cropping a region including each of the one or more objects, select a second image from the plurality of candidate images, and display the second image so that the blank does not exist on the screen of the electronic device in the changed screen display mode.

According to some embodiments, a computer-readable recording medium having recorded thereon a program for executing methods, performed by the above-described electronic device, of adaptively displaying an image may be provided.

FIG. 1 is a view for schematically explaining a method, performed by an electronic device 2000 according to an embodiment, of displaying an image.

Referring to FIG. 1, the electronic device 2000 according to an embodiment may include a display to output an image and/or a moving picture. For example, the electronic device 2000 may include, but is not limited to, a smart TV, a smartphone, a tablet PC, a laptop PC, and a frame-type display, and may be implemented as various types and shapes of electronic devices including displays. The electronic device 2000 may be an electronic device that provides a changeable screen display mode. The screen display mode of the electronic device 2000 may include a landscape mode and a portrait mode, and the electronic device 2000 may change from the landscape mode to the portrait mode, or from the portrait mode to the landscape mode. The landscape mode may be a screen display mode for displaying an image that is longer in a horizontal direction than in a vertical direction, and the portrait mode may be a screen display mode for displaying an image that is longer in vertical direction than in the horizontal direction.

The electronic device 2000 according to an embodiment may display a first image 110. In some embodiments, the first image 110 may be content of a user. In some embodiments, the content of the user may be content owned by the user through purchase, production, or the like. The electronic device 2000 may identify that the screen display mode of the electronic device 2000 is changed, while displaying the first image 110.

According to an embodiment, the electronic device 2000 may identify whether a blank exists on the screen of the electronic device 2000, when the first image 110 is displayed in a changed screen display mode. For example, the middle image in FIG. 1 illustrates the changed screen display mode which, in this example, has changed from the landscape display mode of the left image of FIG. 1 to the portrait display mode of the middle image and right image of FIG. 1. When a blank 105 is generated on the screen of the electronic device 2000 with a change in the screen display mode of the electronic device 2000, the electronic device 2000 may adaptively change the screen of the electronic device so that a second image 120 that is obtained by processing the first image 110 is displayed.

When the screen display mode of the electronic device 2000 is changed and a blank 105 exists on the screen in a changed screen display mode, the electronic device 2000 may determine a crop region 115 within the first image in accordance with a screen ratio of the changed screen display mode.

According to an embodiment, when determining the crop region 115, the electronic device 2000 may determine the crop region 115, based on one or more objects existing in the first image. The electronic device 2000 may detect the one or more objects from the first image 110, may determine crop regions 115 in various ways, and may generate a plurality of cropped candidate images, based on the determined crop regions 115.

The electronic device 2000 may select the second image 120 from the plurality of cropped candidate images and may display the selected second image 120 on the screen of the electronic device 2000. In this case, the electronic device 2000 may re-adjust a size of the selected second image 120 in accordance with a screen resolution of the electronic device 2000, and may improve the quality of image.

The electronic device 2000 according to an embodiment may process an image so that the content is naturally displayed on the screen of the electronic device 2000, and adaptively display the content, even when the screen display mode of the electronic device 2000 is changed, thereby maximizing the display of the content to use a larger area of the display and thus improve a content viewing experience.

Detailed methods, performed by the electronic device 2000, of adaptively displaying an image will be described in more detail in the drawings and their descriptions, which will be described later.

Figure 2:
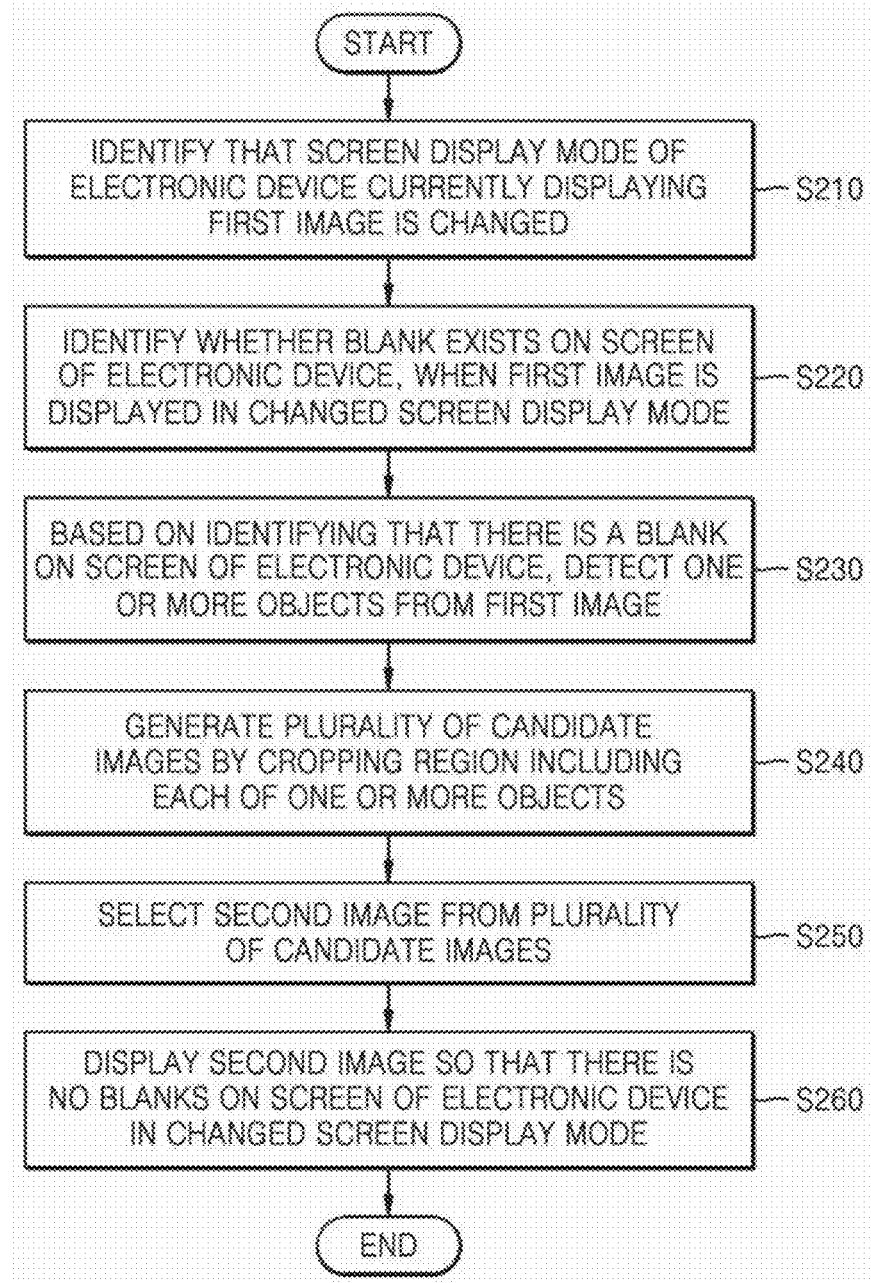
FIG. 2 is a flowchart of a method of displaying an image, according to an embodiment.

FIG. 2 is a flowchart of a method, performed by the electronic device 2000 according to an embodiment, of displaying an image.

In operation S210, the electronic device 2000 according to an embodiment identifies that a screen display mode of the electronic device 2000 currently displaying a first image is changed.

According to an embodiment, the screen display mode of the electronic device 2000 may be a landscape mode or a portrait mode. The electronic device 2000 may identify that the screen display mode of the electronic device 2000 is changed while the electronic device 2000 is displaying the first image.

For example, the electronic device 2000 may identify that, while the electronic device 2000 is displaying the first image in the landscape mode, the screen display mode of the electronic device 2000 is changed to the portrait mode. As another example, the electronic device 2000 may identify that, while the electronic device 2000 is displaying the first image in the landscape mode, the screen display mode of the electronic device 2000 is changed to the landscape mode.

According to an embodiment, the electronic device 2000 may provide a user interface capable of switching between the landscape mode and the portrait mode of the electronic device 2000. For example, the electronic device 2000 may switch the landscape mode to the portrait mode according to a user input of switching the landscape mode to the portrait mode that is received by the electronic device 2000 while the electronic device 2000 is operating in the landscape mode. In detail, according to receiving a user input of requesting to switch the screen display mode, the electronic device 2000 may switch the screen display mode by controlling the screen of the electronic device 2000 to rotate by a certain angle (e.g., 90 degrees) by using a rotation device installed in the electronic device 2000.

In operation S220, the electronic device 2000 according to an embodiment identifies whether a blank exists on the screen of the electronic device 2000, when the first image is displayed in a changed screen display mode.

According to an embodiment, when the screen display mode of the electronic device 2000 is changed, a blank may exist on the screen of the electronic device 2000 in the screen display mode after the change due to the resolution of the first image displayed in the screen display mode before the change.

For example, the electronic device 2000 may display the first image in the landscape mode. The first image, which is displayed in the landscape mode, may be an image suitable for being displayed in the landscape mode. Accordingly, when the screen display mode of the electronic device 2000 is changed to the portrait mode and the first image is still displayed horizontally on the screen in the portrait mode, a blank may be created on the screen of the electronic device 2000. When the first image before the screen display mode is changed is continuously displayed in the changed screen display mode, the electronic device 2000 may identify whether a blank exists on the screen of the electronic device 2000. For example, when the screen display mode of the electronic device 2000 is changed from the landscape mode to the portrait mode, and the first image is not able to be completely displayed in the portrait mode due to a difference in resolution because the first image displayed in the landscape mode before the change is horizontally long, the electronic device 2000 may display the first image to a size reduced while maintaining the ratio of the first image, in the portrait mode. As the first image is displayed in the portrait mode and thus there is an area in which pixel data to be displayed on the screen of the electronic device 2000 does not exist, the electronic device 2000 may determine that there is a blank on the screen of the electronic device 2000.

In operation S230, based on identifying that there is a blank on the screen of the electronic device 2000 according to an embodiment, the electronic device 2000 detects one or more objects from the first image.

According to an embodiment, the electronic device 2000 may identify the type and location of an object existing in the first image by using an artificial intelligence (AI) model. For example, the electronic device 2000 may detect objects from the first image by using the AI model, and may segment the detected objects.

According to an embodiment, the electronic device 2000 may generate a region of interest (ROI) map indicating ROIs in the first image. An ROI refers to a region in which an object exists in an image, and a plurality of ROIs may exist in the image. The ROI map may be, but is not limited to, a saliency map. The saliency map may be a map representing a region in an image that is most likely to contain an object. The electronic device 2000 may recognize one or more objects in the first image, based on the ROI map.

According to an embodiment, the electronic device 2000 may recognize the one or more objects in the first image by using computer vision techniques. In this case, the electronic device 2000 may more accurately identify the type and location of the object by using the ROI map.

In operation S240, the electronic device 2000 according to an embodiment generates a plurality of candidate images by cropping a region including each of the one or more objects. However, cropping is only an example and, in some embodiments, the candidate images may be generated by other image processing/manipulation techniques such as rotating, texturing, using color, using contrast, using proportions, using brightness differences, etc.

According to an embodiment, the electronic device 2000 may generate the candidate images by cropping a region including the one or more objects within the first image in various ways. In some embodiments, the electronic device 2000 may generate the candidate images by cropping the first image into regions including the one or more objects within the first image in various ways.

For example, the electronic device 2000 may crop the first image so that a candidate image includes one object. As another example, the electronic device 2000 may crop the first image so that a candidate image includes two or more objects.

The electronic device 2000 may generate candidate images, based on a preset condition. For example, the preset condition may be a screen aspect ratio of the electronic device 2000. The electronic device 2000 may crop the region including the one or more objects within the first image, based on the aspect ratio of a region to be cropped.

In operation S250, the electronic device 2000 according to an embodiment selects a second image from the plurality of candidate images.

According to an embodiment, the electronic device 2000 may select the second image in various ways. For example, the electronic device 2000 may select an arbitrary image as the second image from among the plurality of candidate images. As another example, the electronic device 2000 may select, as the second image, a candidate image including an object classified as a main object from among the one or more objects within the first image. As another example, the electronic device 2000 may select a plurality of images as the second image from among the plurality of candidate images.

In operation S260, the electronic device 2000 according to an embodiment displays the second image so that there are no blanks on the screen of the electronic device 2000 in the changed screen display mode.

According to an embodiment, the electronic device 2000 may adjust the size of the second image and improve the resolution, in order to display the second image so that no blanks exist on the screen of the electronic device 2000.

Figure 3:
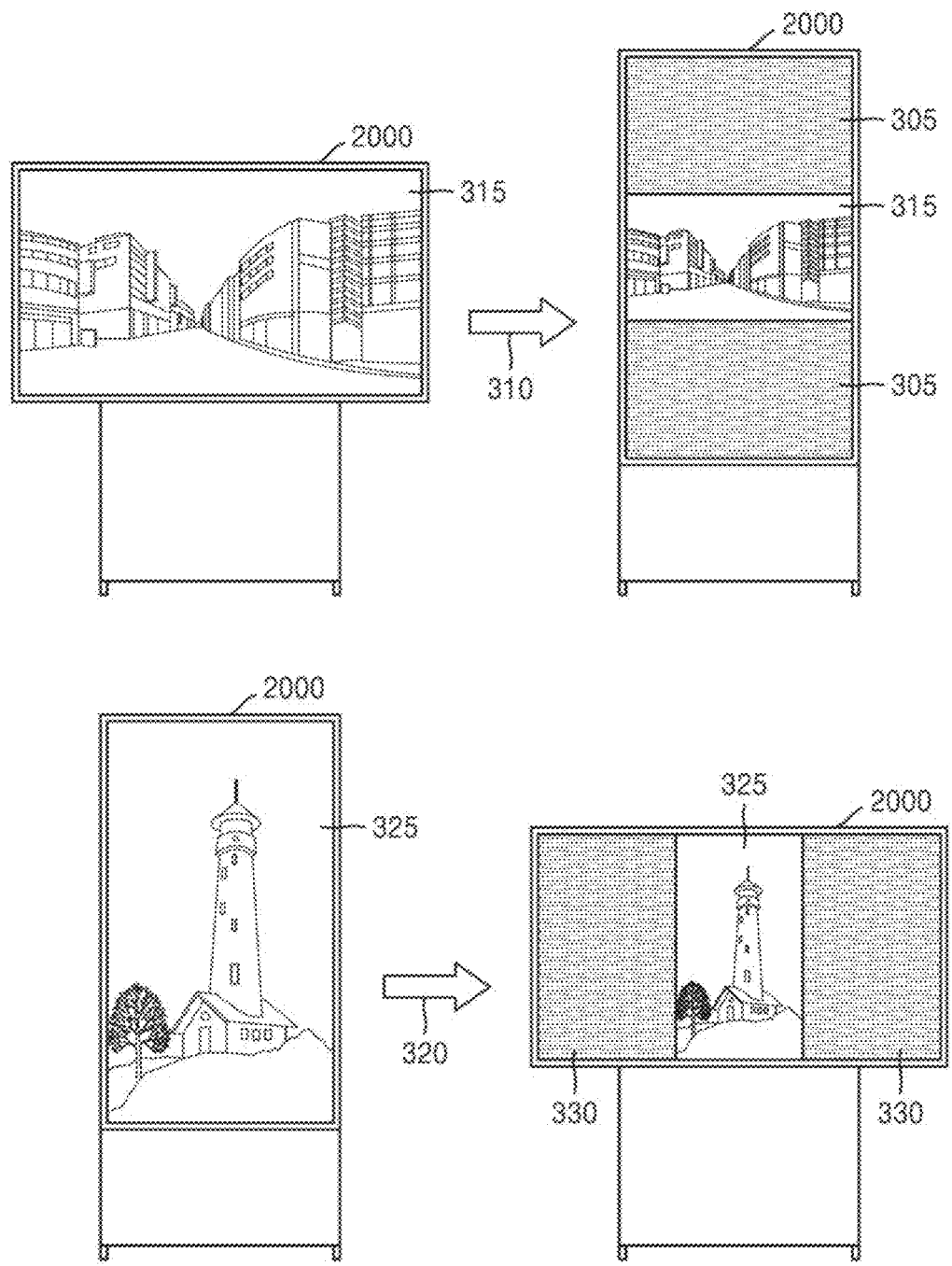
FIG. 3 is a diagram for explaining an operation in which a display mode of an electronic device is changed, according to an embodiment.

FIG. 3 is a diagram for explaining an operation in which a display mode of the electronic device 2000 according to an embodiment is changed.

According to an embodiment, the electronic device 2000 may be an electronic device 2000 of which a screen display mode is changeable. For example, the electronic device 2000 may be an electronic device 2000 of which screen is switchable between the landscape mode and the portrait mode. In some embodiments, the electronic device 2000 may be an electronic device 2000 of which screen is rotatable between the landscape mode and the portrait mode. The electronic device 2000 may identify that the screen display mode of the electronic device 2000 is changed, and may perform operations according to a change in the screen display mode.

In a case 310 where the screen display mode of the electronic device 2000 is changed from the landscape mode to the portrait mode, an image 315 currently being displayed on a landscape mode screen of the electronic device 2000 is an image with an aspect ratio that makes the image longer in a horizontal direction than in a vertical direction. The size of the image 315 currently being displayed on the landscape mode screen is adjusted as the screen display mode of the electronic device 2000 is changed to the portrait mode. In this case, a black blank 305 may be generated on a portrait mode screen of the electronic device 2000.

In a case 320 where the screen display mode of the electronic device 2000 is changed from the portrait mode to the landscape mode, an image 325 currently being displayed on the portrait mode screen of the electronic device 2000 is an image with an aspect ratio that makes the image longer in a vertical direction than in a horizontal direction. The size of the image 325 currently being displayed on the portrait mode screen is adjusted as the screen display mode of the electronic device 2000 is changed to the landscape mode. In this case, a black blank 330 may be generated on the landscape mode screen of the electronic device 2000.

The electronic device 2000 according to an embodiment may identify that the screen display mode of the electronic device 2000 currently displaying a first image is changed from the landscape mode to the portrait mode or from the portrait mode to the landscape mode. After the screen display mode of the electronic device 2000 is changed, when the first image displayed before the screen display mode is changed is displayed on the screen of the electronic device 2000, the electronic device 2000 may identify whether there is a blank on the screen of the electronic device 2000.

Figure 4A:
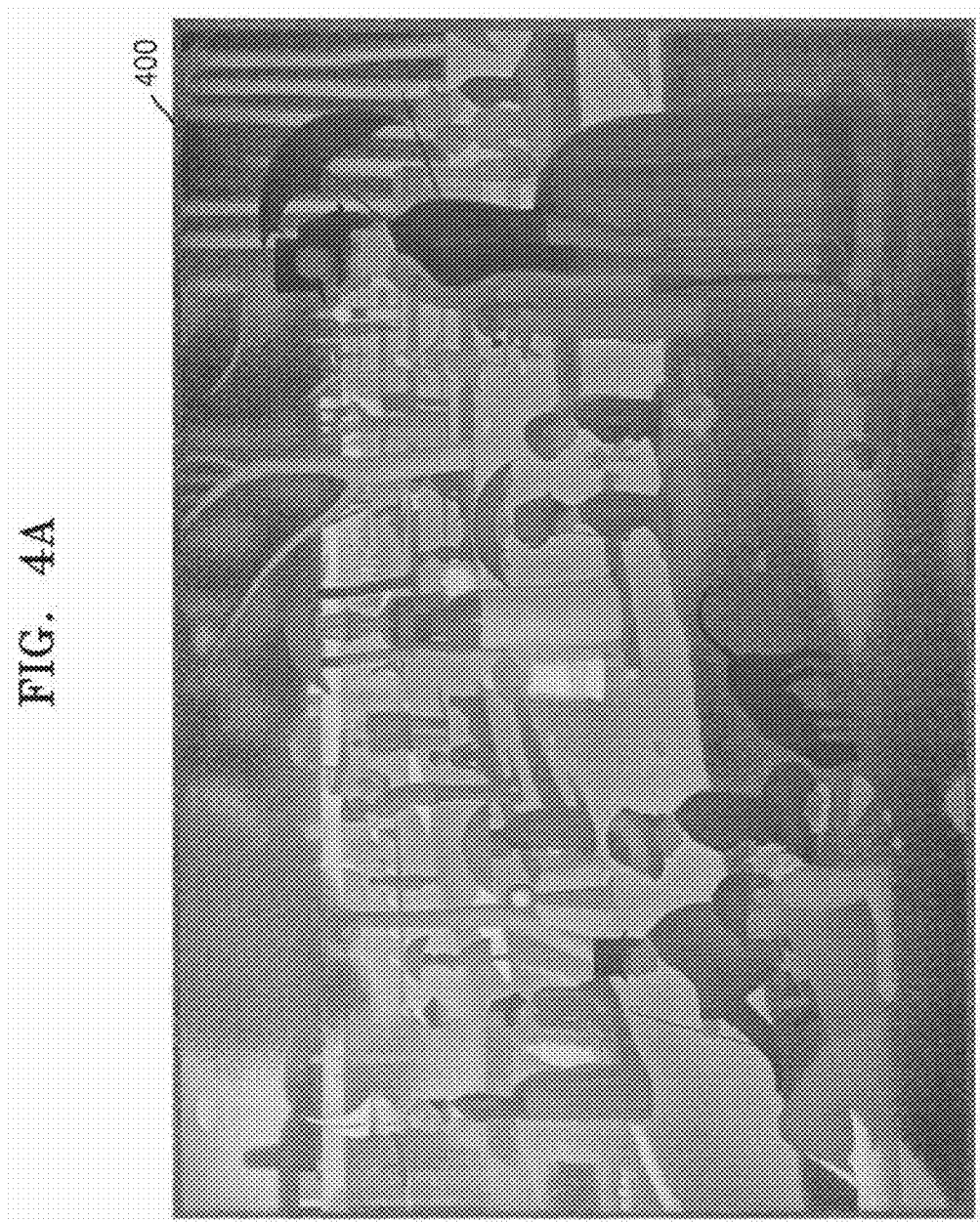
FIG. 4A is a view for explaining an image that is used to explain an operation of an electronic device, according to an embodiment.

FIG. 4A is a view for explaining an image that is used to explain an operation of an electronic device according to an embodiment.

Referring to FIG. 4A, one item from a collection of the Art Institute of Chicago, which is an oil painting by Georges Seurat ("A Sunday Afternoon on the Island of La Grande Jatte,"1884-1886. The Art Institute of Chicago,) will be illustrated as an example. In a disclosed embodiment, 'A Sunday Afternoon on the Island of Grande Jatte' was used as it was designated as a public domain of Creative Commons Zero (CC0), and a caption according to the use of an image was stated at the bottom of the image.

Figure 4B:
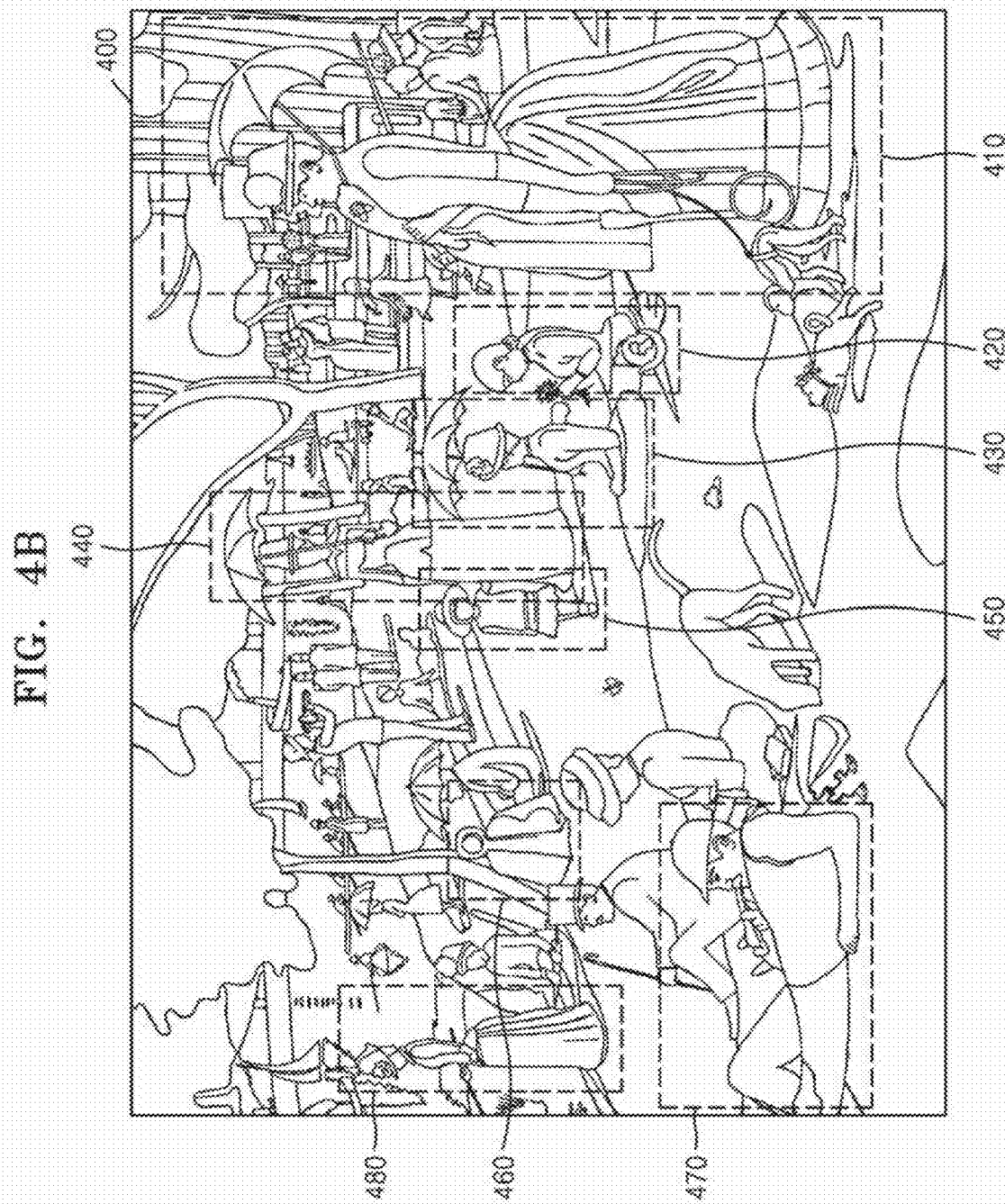
FIG. 4B is a diagram for explaining an operation of detecting an object within an image, according to an embodiment.

FIG. 4B is a diagram for explaining an operation, performed by the electronic device 2000 according to an embodiment, of detecting an object within an image.

Referring to FIG. 4B, the electronic device 2000 according to an embodiment may detect a plurality of objects within a first image 400.

For example, the electronic device 2000 may detect a first object 410, a second object 420, a third object 430, a fourth object 440, a fifth object 450, a sixth object 460, a seventh object 470, and an eighth object 480 from the first image 400. However, this is only an example for convenience of description, and in some embodiments the electronic device 2000 may detect all objects existing in the first image 400. Although the detected objects are displayed in rectangular boxes, this is only an example, and the electronic device 2000 may detect an object by extracting the shape of an actual object by segmenting the outline of the object.

According to an embodiment, the electronic device 2000 may determine a crop region to include one or more of the objects detected from the first image. For example, the electronic device 2000 may determine a region including a first object 410 as the crop region. As another example, the electronic device 2000 may determine, as the crop region, a region including the second object 420 and the third object 430, which are objects adjacent to one another within a certain interval. As another example, the electronic device 2000 may determine, as the crop region, a region including the fourth object 440 and the fifth object 450, which are partially overlapped by each other. In other words, the electronic device 2000 may determine the crop region so that one or more objects are included in the crop region.

According to an embodiment, the electronic device 2000 may identify respective aspect ratios of the objects detected from the first image. The aspect ratio of an object may be used by the electronic device 2000 to determine the crop region. For example, the first object 410 has an aspect ratio having a long height and a short width, the sixth object 460 has an aspect ratio having a width and a height that are the same as each other, and the seventh object 470 has an aspect ratio having a long width and a short height. The electronic device 2000 may determine the crop region, based on an aspect ratio of each of the first through eighth objects 410 through 480.

Figure 4C:
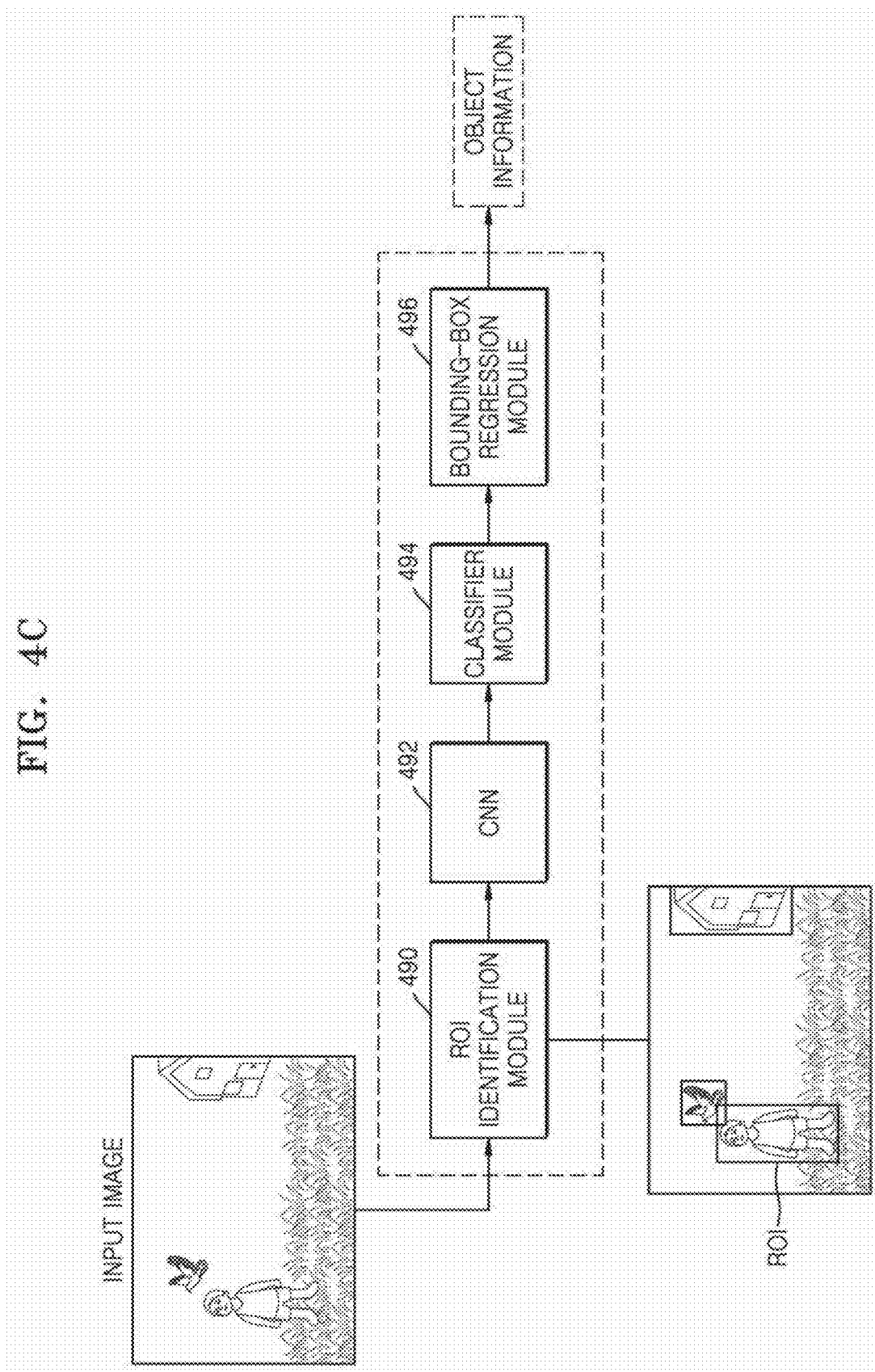
FIG. 4C is a view illustrating an example of an artificial intelligence (AI) model with which an electronic device detects an object, according to an embodiment.

FIG. 4C is a view illustrating an example of an AI model with which the electronic device 2000 according to an embodiment detects an object.

Referring to FIG. 4C, an object detection model may include an ROI identification module 490, a convolutional neural network (CNN) 492, a classifier module 494, and a bounding-box regression module 496.

The ROI identification module 490 extracts an ROI from an input image. The ROI may be extracted in the form of a ROI map, and the ROI may be, for example, a saliency map. The ROI identification module may generate ROIs, based on the ROI map.

The CNN 492 receives an input image or an image obtained by cropping an ROI, and extracts a feature vector from the received image. Neural networks of various structures (e.g., AlexNet and VggNet) may be used as the CNN 492.

The classifier module 494 performs image classification, based on the feature vector output by the CNN 492. The feature vector may include a class, a probability value, and the like of a detected object.

The bounding-box regression module 494 calculates four numbers x, y, w, and h representing a box including the detected object. The location of an object may be specified by the four numbers x, y, w, and h representing the box. By performing bounding box regression, a localization error of the detected object may be reduced.

According to an embodiment, the object detection model may segment the detected object. For example, the object detection model may include a semantic segmentation module. In semantic segmentation, in order to segment an image into similar regions in a semantic aspect or from a perceptual point of view, an image is divided into meaningful regions by precisely extracting up to the boundary of an object from an image. In other words, in image semantic segmentation, an image is understood at a pixel level, and an object class is allocated to each pixel of the image to identify the boundary of each object.

The object detection model of FIG. 4C illustrates an example for performing object detection, and an object detection method is not limited thereto. The object detection model may be replaced by models other than the CNN 492 (for example, vision transformer (ViT) and a multi-layer perceptron (MLP) mixer).

The electronic device 2000 according to an embodiment may obtain object information. The object information may include, but is not limited to, the type of an object and the location of the object.

Figure 5:
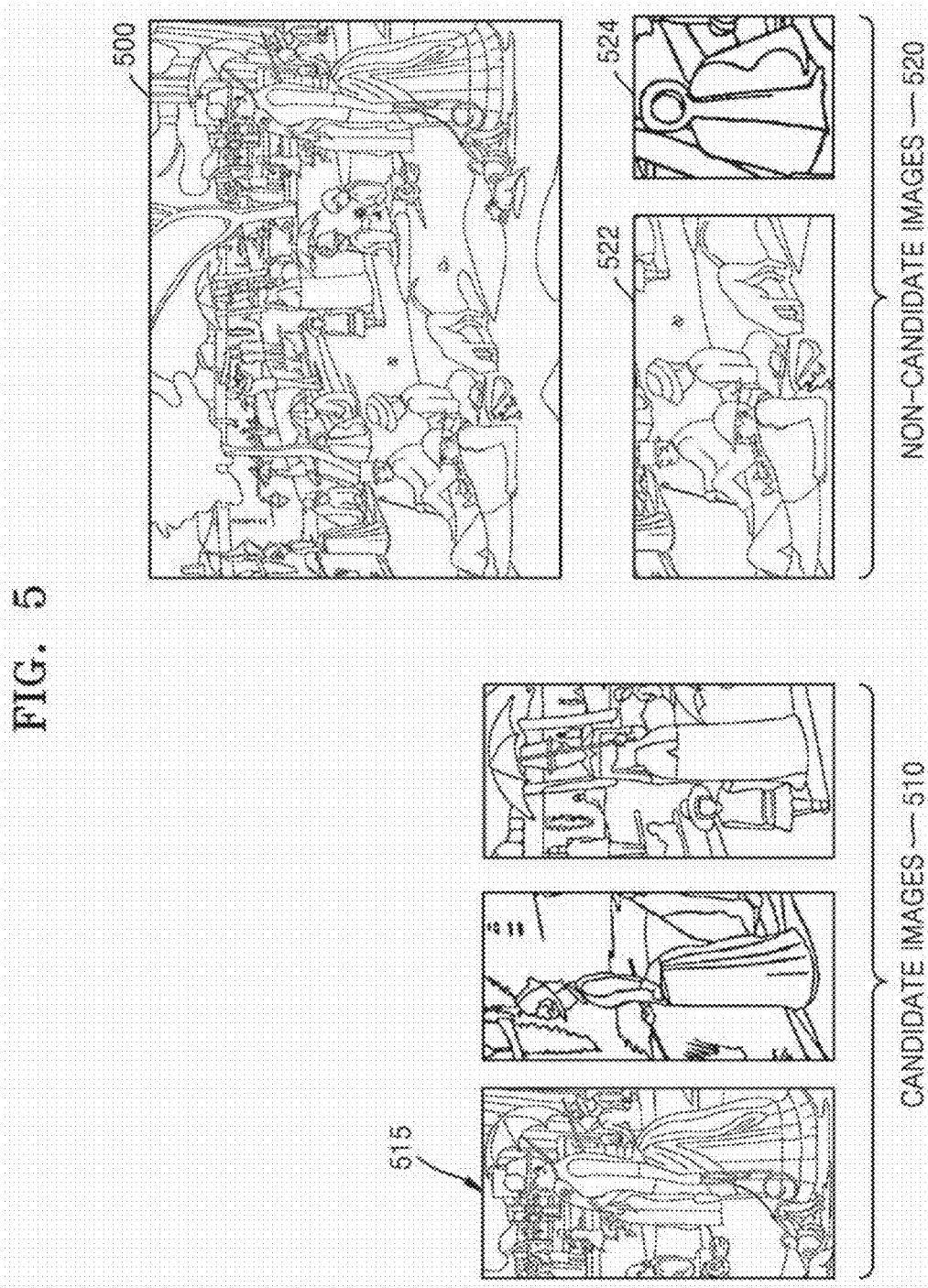
FIG. 5 is a view for explaining an operation of generating candidate images cropped to include detected objects, according to an embodiment.

FIG. 5 is a view for explaining an operation, performed by the electronic device 2000 according to an embodiment, of generating candidate images cropped to include detected objects.

FIG. 5 will now be described by illustrating a case where the screen display mode of the electronic device 2000 is changed from the landscape mode to the portrait mode. FIG. 5 will now be also described by illustrating a case where a blank is generated on the portrait mode screen of the electronic device 2000 when the first image 500 is displayed in the landscape mode and the screen display mode of the electronic device 2000 is changed from the landscape mode to the portrait mode. However, this is for convenience of description, and the following description related to FIG. 5 is equally applicable to the opposite case of changing from portrait mode to landscape mode.

Referring to FIG. 5, the electronic device 2000 according to an embodiment may generate a plurality of candidate images 510 by cropping the first image 500 so that the plurality of candidate images 510 include one or more objects detected from the first image 500.

According to an embodiment, the plurality of candidate images 510 may be images that are to be used and to be displayed on a changed screen display mode when the screen display mode of the electronic device 2000 is changed. The electronic device 2000 according to an embodiment may determine a crop region for generating the plurality of candidate images 510. For example, the electronic device 2000 may determine the crop region, based on at least one of the resolution of an image, the screen display mode of the electronic device 2000, or the aspect ratio of a detected object.

According to an embodiment, the candidate images 510 as the images to be used when the screen display mode of the electronic device 2000 is changed from the landscape mode to the portrait mode may be images each having a longer vertical length than a horizontal length. In this case, images not suitable for being displayed in the portrait mode are classified as non-candidate images 520. For example, a detected first object 522 may not be suitable for being used in the portrait mode, because the first object 522 has a long width. Accordingly, the electronic device 2000 may determine that the first object 522 is not cropped. As another example, a detected second object 524 may not be suitable for being used in the portrait mode, because the second object 524 has a small size and thus degrades in terms of image quality when the second object 524 is re-sized. Accordingly, the electronic device 2000 may determine that the second object 524 is not cropped. As another example, when the crop region is determined to include the second object 524, other objects within an image may be included in a cropped image. In this case, the electronic device 2000 may determine that the second object 524 is not cropped.

According to an embodiment, the electronic device 2000 may identify objects suitable for being displayed on the screen in the portrait mode, and may determine the crop region to include the identified objects. The electronic device 2000 may generate the plurality of candidate images 510, based on the determined crop region.

According to an embodiment, the electronic device 2000 may select, from the plurality of candidate images 510, a second image 515, which is an image to be displayed in the portrait mode of the electronic device 2000. For example, in some embodiments, the electronic device 2000 may select an arbitrary image as the second image 515 from among the plurality of candidate images. As another example, in some embodiments, the electronic device 2000 may select, as the second image 515, a candidate image including an object classified as a main object from among the one or more objects within the first image 500. As another example, in some embodiments, the electronic device 2000 may select a plurality of images as the second image 515 from among the plurality of candidate images.

Figure 6:
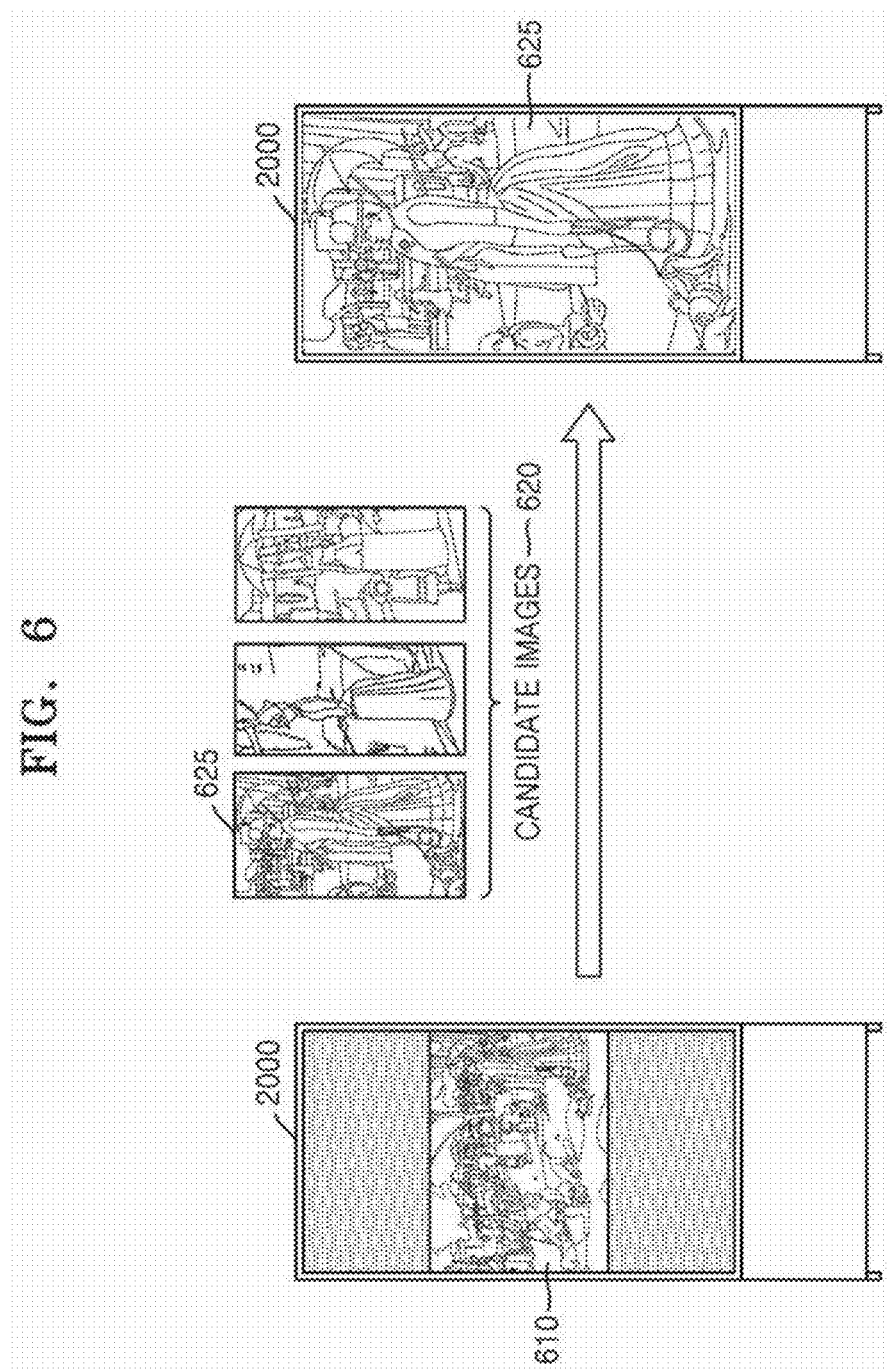
FIG. 6 is a view for explaining an operation of displaying a second image in a changed screen display mode, according to an embodiment.

FIG. 6 is a view for explaining an operation, performed by the electronic device 2000 according to an embodiment, of displaying a second image in a changed screen display mode.

FIG. 6 will now be described by illustrating a case where the screen display mode of the electronic device 2000 is changed from the landscape mode to the portrait mode. However, this is for convenience of description, and the description of FIG. 6 is equally applicable to the opposite case.

According to an embodiment, the electronic device 2000 may identify that the screen display mode of the electronic device 2000 currently displaying a first image is changed, and may identify whether a blank exists on the screen of the electronic device 2000 when a first image 610 is displayed in a changed screen display mode.

For example, when the screen display mode of the electronic device 2000 is changed from the landscape mode to the portrait mode, the first image 610 displayed in the landscape mode may be displayed in the portrait mode while maintaining the original ratio. In this case, the electronic device 2000 may identify whether there is a blank within a screen generated as the first image 610 is displayed in the portrait mode.

When the first image 610 is displayed in the portrait mode to which the screen display mode has been changed and, in this case, a blank exists on the screen of the electronic device 2000, the electronic device 2000 may detect one or more objects from the first image 610.

By cropping a region including a detected object, the electronic device 2000 according to an embodiment may generate candidate images 620 that are to be displayed in a changed screen display mode of the electronic device 2000.

According to an embodiment, the electronic device 2000 may select a second image 625 from among the candidate images 620. The electronic device 2000 may arbitrarily select the second image 625 from among the candidate images 620, or may select the second image 625 from among the candidate images 620 according to a specific priority. The electronic device 2000 may display the second image 625 in the portrait mode. When the second image 625 is displayed in the portrait mode, the electronic device 2000 may display the second image 625 so that no blanks exist on the screen of the electronic device 2000. In this case, the electronic device 2000 may adjust the size of the second image 625, which is a cut-out portion of the first image 610, in accordance with a screen size of the electronic device 2000, and may improve the resolution. In this case, various image processing techniques, such as a super-resolution and a high dynamic range (HDR), may be used. In some embodiments, the resolution may be improved by changing the resolution. In some embodiments, the resolution may be improved by increasing the resolution.

Figure 7:
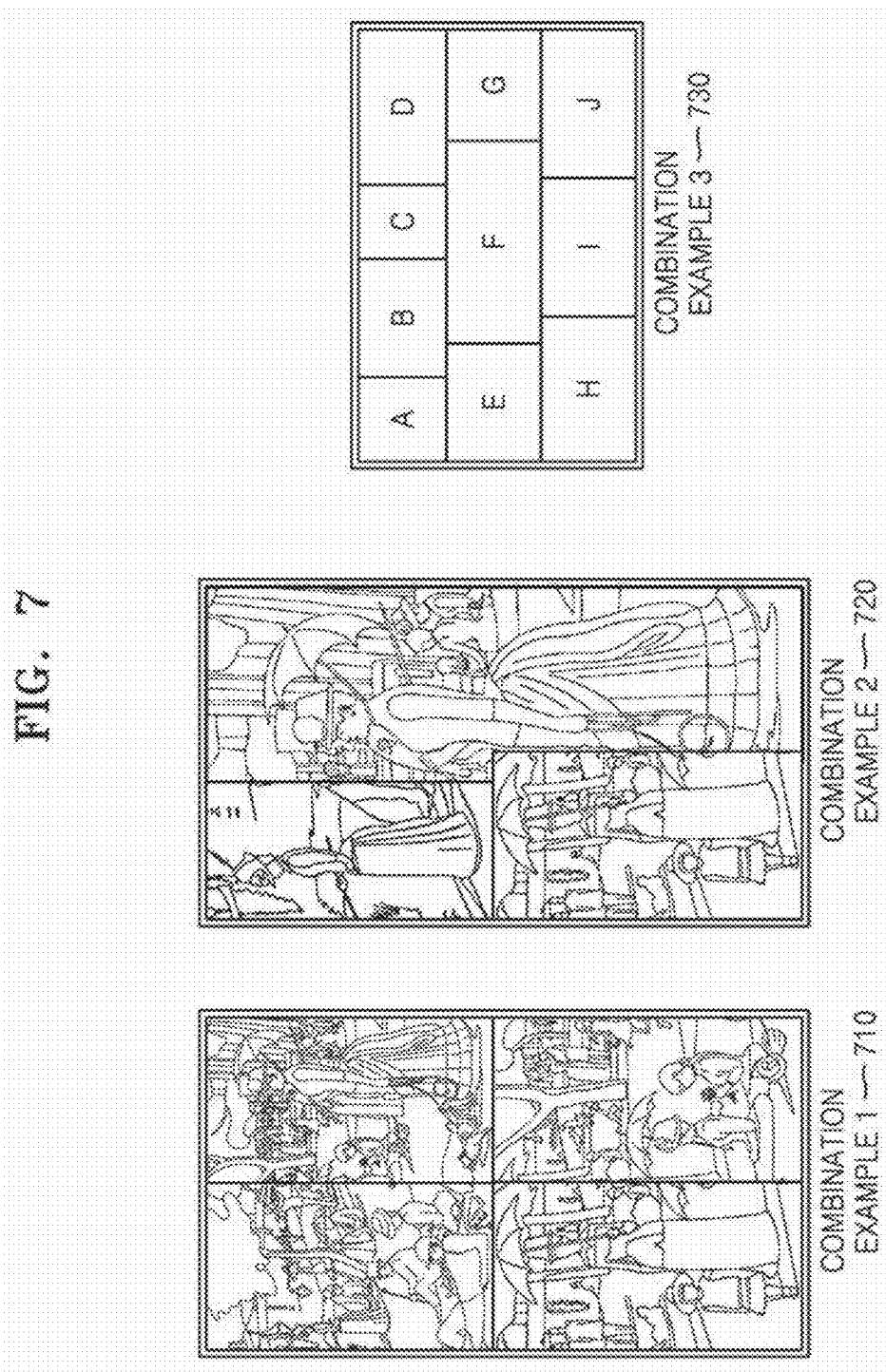
FIG. 7 is a view for explaining an operation of displaying a plurality of second images, according to an embodiment.

FIG. 7 is a view for explaining an operation, performed by the electronic device 2000 according to an embodiment, of displaying a plurality of second images.

According to an embodiment, the electronic device 2000 may select the plurality of second images from among a plurality of candidate images. When displaying the plurality of second images in a changed screen display mode, the electronic device 2000 may combine the plurality of second images with each other and display a result of the combination. The plurality of second images selected from the plurality of candidate images may be a portion of the plurality of candidate images. The portion may be a subset of the candidate images. For example, when there are 100 candidate images, 10 second images may be selected.

For example, when the screen display mode of the electronic device 2000 is changed from the landscape mode to the portrait mode, the electronic device 2000 may select the plurality of second images from the candidate images, may combine the selected second images with one another, and may display a result of the combination. Referring to a combination example 1 (710), the electronic device 2000 may re-size the plurality of second images to the same sizes, and may display a combination of the second images so that no blanks exist on the portrait mode screen of the electronic device 2000. Referring to a combination example 2 (720), the electronic device 2000 may re-size the plurality of second images to different sizes by reflecting the original size of an object within a first image, and may display a combination of the second images so that no blanks exist on the portrait mode screen of the electronic device 2000.

As another example, when the screen display mode of the electronic device 2000 is changed from the portrait mode to the landscape mode, the electronic device 2000 may identify that the screen display mode is changed, and may identify whether a blank exists on the screen of the electronic device 2000 when a first image is displayed in the landscape mode. The electronic device 2000 may generate the plurality of candidate images cropped to include an object within the first image, and may select the plurality of second images from the generated plurality of candidate images. Referring to a combination example 3 (730), the electronic device 2000 may combine second images A through J, which are the plurality of second images, with one another, and may display a result of the combination so that no blanks exist on the landscape mode screen of the electronic device 2000.

Figure 8:
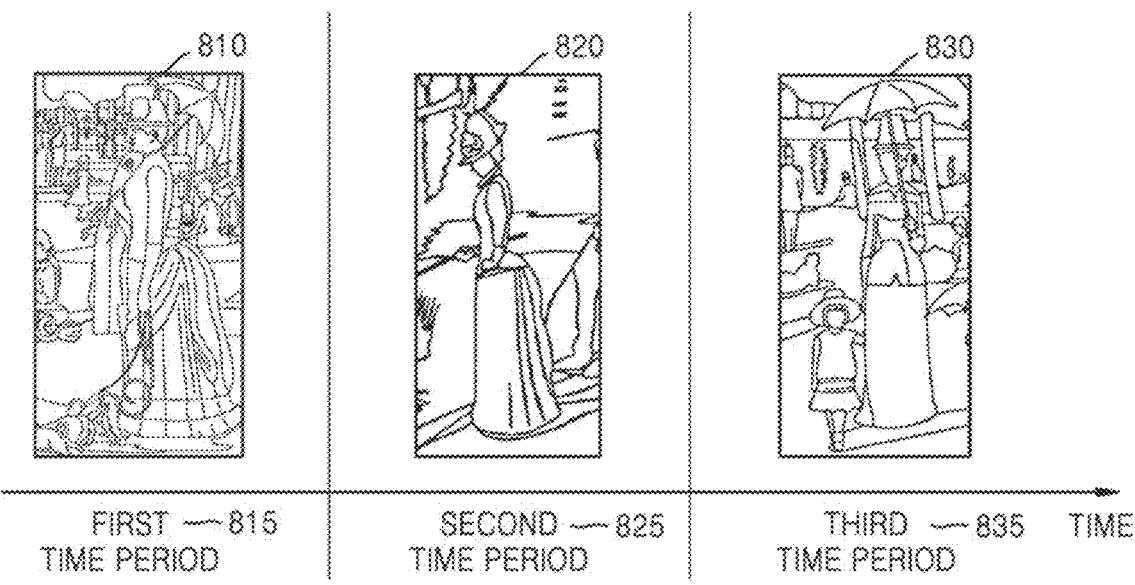
FIG. 8 is a view for explaining another operation of displaying a plurality of second images, according to an embodiment.

FIG. 8 is a view for explaining another operation, performed by the electronic device 2000 according to an embodiment, of displaying a plurality of second images.

FIG. 8 will now be described by illustrating a case where the screen display mode of the electronic device 2000 is changed from the landscape mode to the portrait mode. However, this is for convenience of description, and the description of FIG. 8 is equally applicable to the opposite case.

According to an embodiment, the electronic device 2000 may select the plurality of second images from among a plurality of candidate images. When displaying the plurality of second images in a changed screen display mode, the electronic device 2000 may sequentially display the plurality of second images.

For example, when the screen display mode of the electronic device 2000 is changed from the landscape mode to the portrait mode, the electronic device 2000 may enable a second image 810 to be displayed on the screen of the electronic device 2000 in the portrait mode during a preset first time period 815. When the preset first time period 815 elapses, the electronic device 2000 may enable a second image 820 to be displayed on the screen of the electronic device 2000 in the portrait mode during a preset second time period 825. When the preset first time period 825 elapses, the electronic device 2000 may enable a second image 830 to be displayed on the screen of the electronic device 2000 in the portrait mode during a preset third time period 835. In this case, the preset first time period 815, the preset second time period 825, and the preset third time period 835 may all be the same as each other or different from each other.

The electronic device 2000 may select the plurality of second images from the plurality of candidate images, may combine the selected second images with one another, and may sequentially display a result of the combination. Because a combination of the second images has already been described in the description of FIG. 7, a repeated description will be omitted for conciseness.

Figure 9:
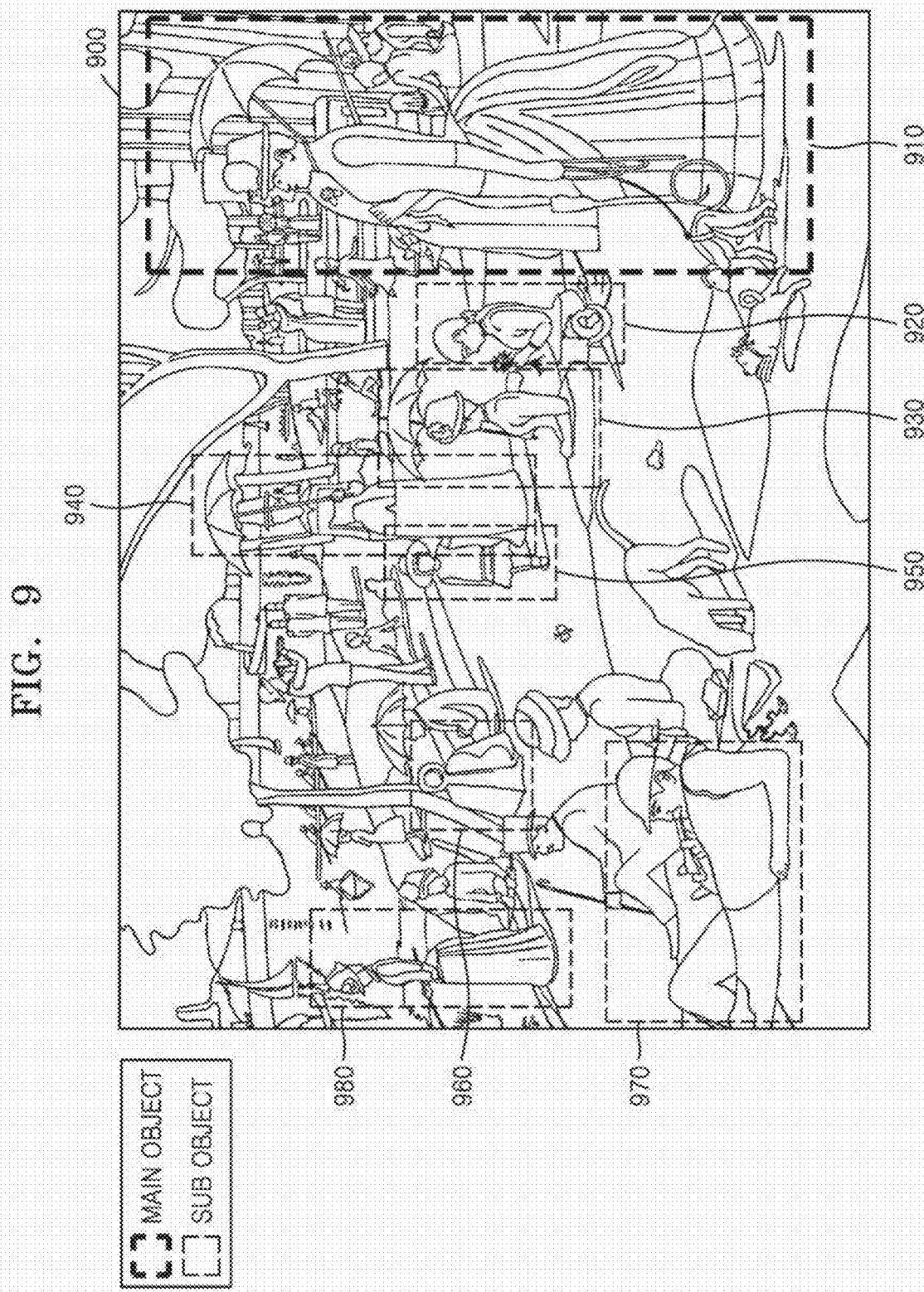
FIG. 9 is a view for explaining an operation of selecting a second image, according to an embodiment.

FIG. 9 is a view for explaining an operation, performed by the electronic device 2000 according to an embodiment, of selecting a second image.

FIG. 9 will now be described by illustrating a case where the screen display mode of the electronic device 2000 is changed from the landscape mode to the portrait mode. However, this is for convenience of description, and the description of FIG. 9 is equally applicable to the opposite case.

Referring to FIG. 9, the electronic device 2000 according to an embodiment may detect a plurality of objects within a first image 900. For example, the electronic device 2000 may detect a first object 910, a second object 920, a third object 930, a fourth object 940, a fifth object 950, a sixth object 960, a seventh object 970, and an eighth object 980 from the first image 900. However, this is only an example for convenience of description, and in some embodiments, the electronic device 2000 may detect all objects existing in the first image 900.

According to an embodiment, when a plurality of objects are recognized from the first image 900, the electronic device 2000 may classify the plurality of objects into a main object and one or more sub objects. In some embodiments, there may be plural main objects and plural sub objects. The electronic device 2000 may determine a main object in the first image 900, based on various criteria. The electronic device 2000 may determine the main object in the first image 900, based on at least one of, for example, a location of an object, a size of the object, a type of the object, or a distance between the objects, but embodiments are not limited thereto.

For example, the electronic device 2000 may determine the first object 910, which is a largest object within the first image 900, as the main object, and may classify second through eighth objects 920 through 980 as sub objects.

For example, the electronic device 2000 may determine an object located at the center within the first image 900 as the main object, and may classify the remaining objects as the sub objects.

For example, the electronic device 2000 may determine a person as the main object from among things and people detected from the first image 900, and may classify the remaining things as the sub objects.

For example, the electronic device 2000 may determine collected objects close to one another as main objects, and may classify the remaining objects as sub objects.

The electronic device 2000 according to an embodiment may determine a crop region to include the first object 910 determined as the main object. The electronic device 2000 according to an embodiment may determine crop regions to respectively include the second through eighth objects 920 through 980 determined as the sub objects. The electronic device 2000 may generate a plurality of candidate images by cropping the first image 900, based on the determined crop regions.

According to an embodiment, the electronic device 2000 may select, as the second image, a candidate image including a main object. The electronic device 2000 may select, as the second image, an image including the first object 910 determined as the main object.

When the screen display mode of the electronic device 2000 is switched from the landscape mode to the portrait mode and a blank is identified within the screen of the electronic device 2000, the electronic device 2000 according to an embodiment may enable the second image including the main object to be displayed on the screen of the electronic device 2000.

Figure 10:
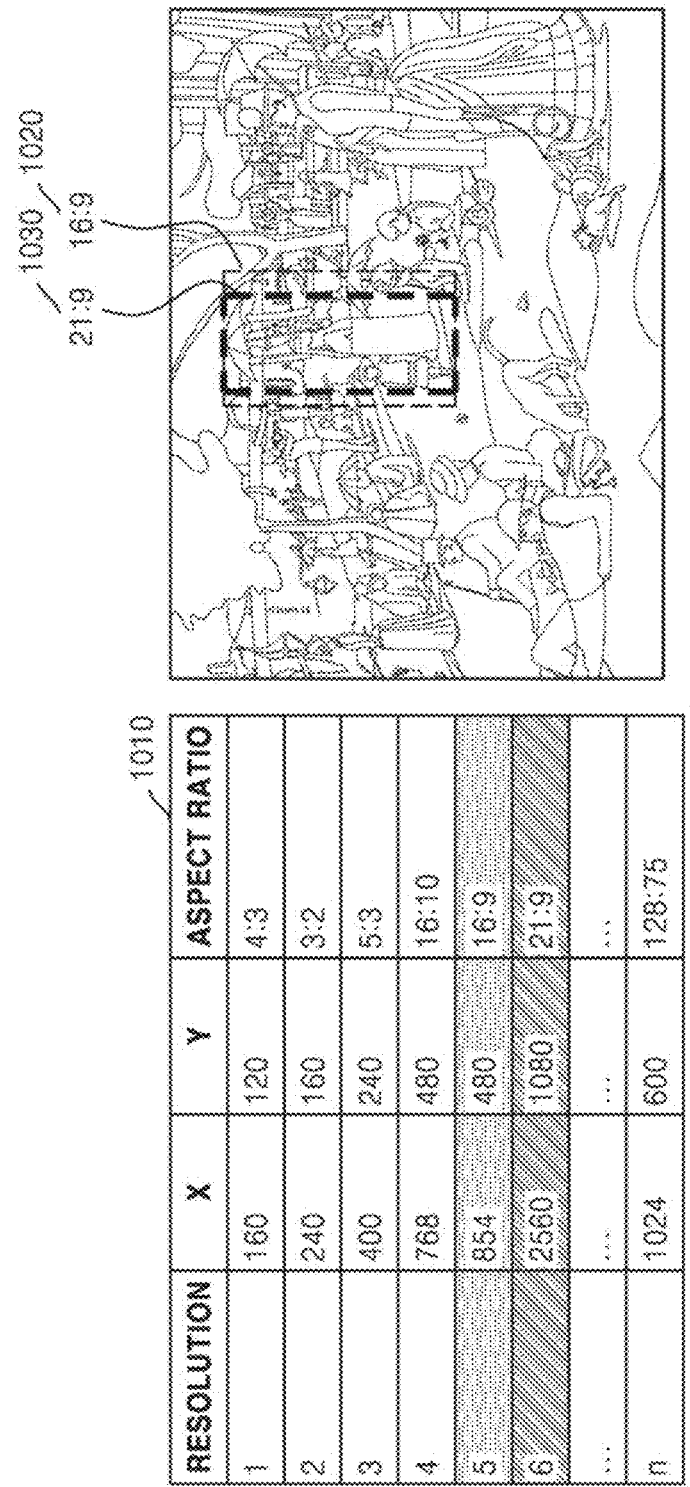
FIG. 10 is a view for explaining a method of determining a crop region in a first image, according to an embodiment.

FIG. 10 is a view for explaining a method, performed by the electronic device 2000 according to an embodiment, of determining a crop region in a first image.

FIG. 10 will now be described by illustrating a case where the screen display mode of the electronic device 2000 is changed from the landscape mode to the portrait mode. However, this is for convenience of description, and the description of FIG. 10 is equally applicable to the opposite case.

According to an embodiment, the electronic device 2000 may obtain specification information of the electronic device, and may determine an aspect ratio of the crop region obtained by cropping the first image, based on the specifications of the electronic device 2000.

According to an embodiment, the electronic device 2000 may obtain a mapping table 1010 in which aspect ratios according to resolutions are mapped. The electronic device 2000 may determine the crop region of the first image, based on the specifications of the electronic device 2000 and the mapping table 1010.

For example, the screen specification of the electronic device 2000 has a resolution of 854*480, the aspect ratio of the screen of the electronic device 2000 may be 16:9. The electronic device 2000 may determine a crop region including an object as a region 1020 having a 9:16 ratio, based on the mapping table 1010. As another example, when the screen specification of the electronic device 2000 has a resolution of 2560*1080, the aspect ratio of the screen of the electronic device 2000 may be 21:9. The electronic device 2000 may determine a crop region including an object as a region 1030 having a 9:21 aspect ratio, based on the mapping table 1010.

The electronic device 2000 according to an embodiment determines the crop region within the first image, based on the specifications of the electronic device 2000. Accordingly, when even the same first image is displayed on another electronic device 2000, a crop region may be different according to the specifications of the electronic device 2000. By determining the crop region, based on the specifications of the electronic device 2000, the electronic device 2000 may enable the ratio of the second image to be not distorted when the second image is displayed after the screen display mode of the electronic device 2000 is changed.

Figure 11:
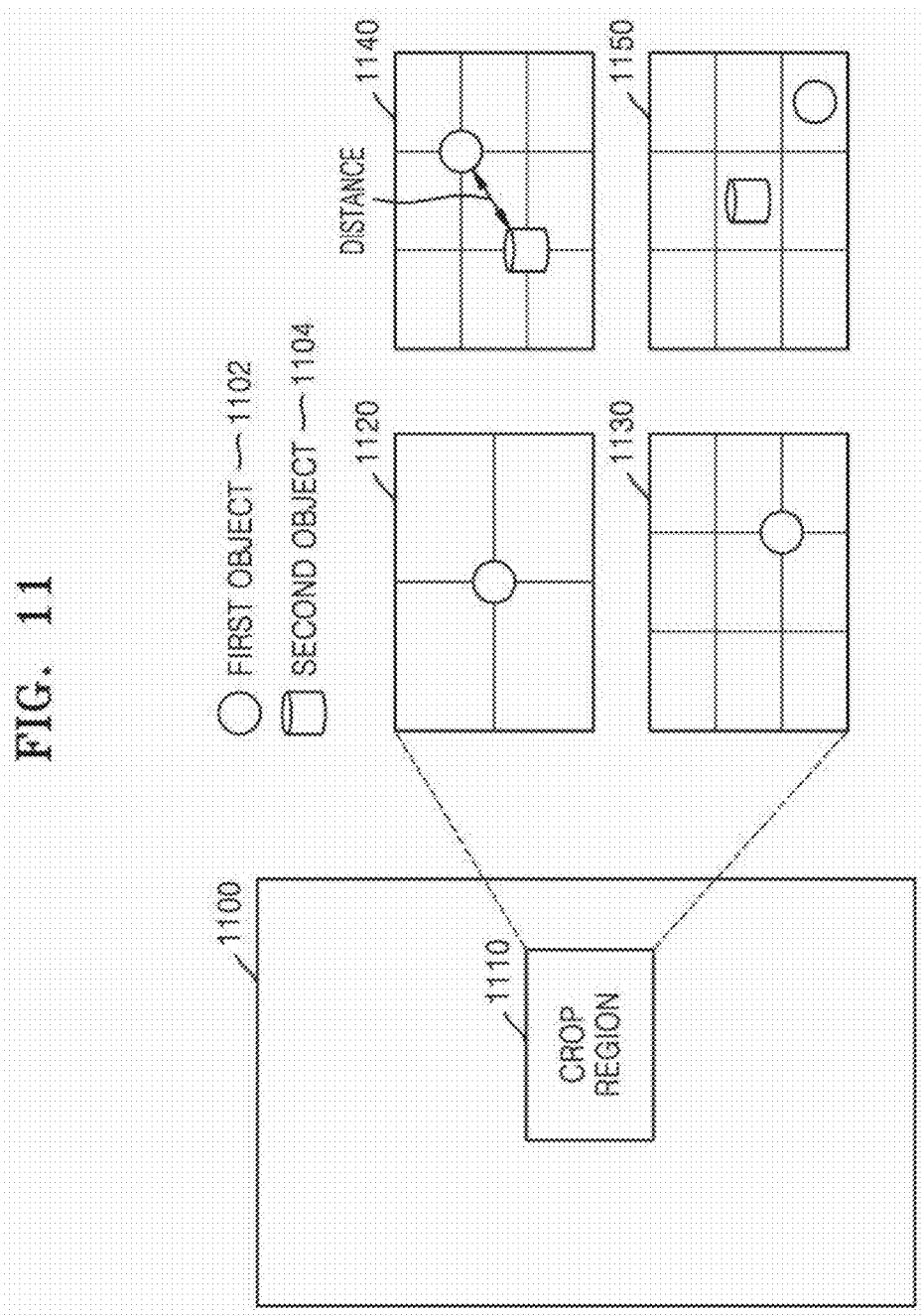
FIG. 11 is a view for explaining another method of determining a crop region in a first image, according to an embodiment.

FIG. 11 is a view for explaining another method, performed by the electronic device 2000 according to an embodiment, of determining a crop region in a first image.

FIG. 11 will now be described by illustrating a case where the screen display mode of the electronic device 2000 is changed from the portrait mode to the landscape mode. However, this is for convenience of description, and the description of FIG. 11 is equally applicable to the opposite case.

Referring to FIG. 11, a first image 1100 is an image displayed when the screen display mode of the electronic device 2000 is the portrait mode. The electronic device 2000 according to an embodiment may generate a second image that is to be displayed when the screen display mode of the electronic device 2000 is changed to the landscape mode. The electronic device 2000 generates a plurality of cropped candidate images by cropping a region including each of one or more objects included in the first image 1100.

According to an embodiment, the electronic device 2000 may determine a crop region 1110 for generating a candidate image. For example, the electronic device 2000 may determine a crop region corresponding to each of the one or more objects, based on at least one of a location of an object within the first image 1100, a number of objects within the first image 1100, and a presence or absence of an object within the first image. The electronic device 2000 may determine, as the crop region 1110, a region including an object within the first image 1100. The electronic device 2000 may determine the crop region 1110, based on the number of objects included in the first image 1110.

According to an embodiment, the electronic device 2000 may allow one object to be included in the crop region 1110. The electronic device 2000 may divide the crop region 1110 (e.g., 4 divisions or 9 divisions), and may determine the crop region 1110 by determining the location of the object, based on the divided regions.

For example, as in a first example 1120, the electronic device 2000 may determine the crop region 1110 by determining the location of a first object 1102 so that the first object 1102 is located at intersections of division lines that divide the crop region 1110 into 4 parts.

As another example, as in a second example 1130, the electronic device 2000 may determine the crop region 1110 by determining the location of the first object 1102 so that the first object 1102 is located at one of intersections of division lines that divide the crop region 1110 into 9 parts.

According to an embodiment, the electronic device 2000 may allow two objects to be included in the crop region 1110. The electronic device 2000 may divide the crop region 1110 (e.g., 4 divisions or 9 divisions), and may determine the crop region 1110 by determining the location of the objects, based on the divided regions.

For example, as in a third example 1140, the electronic device 2000 may determine the crop region 1110 by determining the respective locations of the first object 1102 and a second object 1104 so that the first object 1102 and the second object 1104 are located at the intersections of the division lines that divide the crop region 1110 into 9 parts. In this case, the electronic device 2000 may determine how to divide the crop region 1110 (for example, 9 divisions, 12 divisions, or 16 divisions), based on a distance between the first object 1102 and the second object 1104. The electronic device 2000 may determine the crop region 1110 by determining the respective locations of the first object 1102 and the second object 1104 included in the crop region 1110.

As another example, as in a fourth example 1150, the electronic device 2000 may determine the crop region 1110 by determining the respective locations of the first object 1102 and the second object 1104 so that the first object 1102 and the second object 1104 are located within the 9 parts into which the crop region 1110 is divided. In this case, the electronic device 2000 may determine how to divide the crop region 1110, based on the distance between the first object 1102 and the second object 1104.

Even when three or more objects are to be included in the crop region 1110, the electronic device 2000 according to an embodiment may determine the respective locations of objects in the same ways as the above-described ways and may determine the crop region 1110, thereby determining the crop region 1110 so that the objects are completely included in the crop region 1110.

Figure 12:
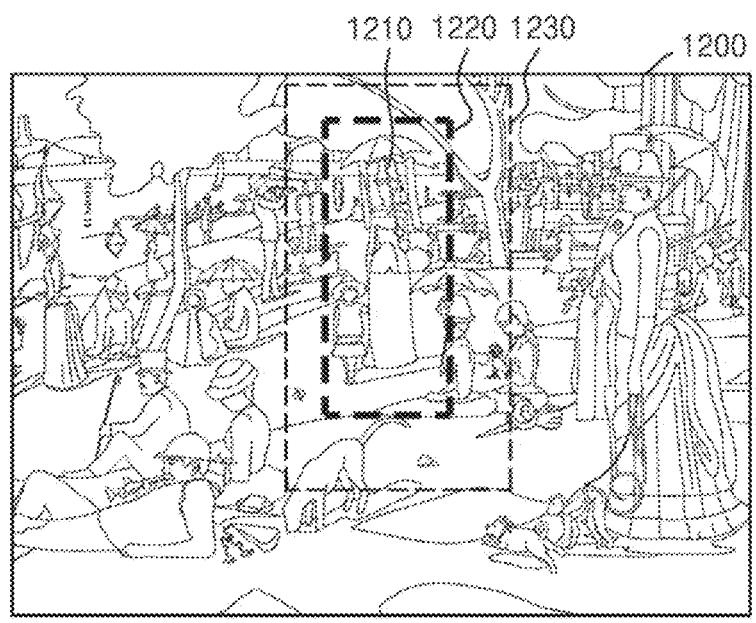
FIG. 12 is a view for explaining another method of determining a crop region in a first image, according to an embodiment.

FIG. 12 is a view for explaining another method, performed by the electronic device 2000 according to an embodiment, of determining a crop region in a first image.

FIG. 12 will now be described by illustrating a case where the screen display mode of the electronic device 2000 is changed from the landscape mode to the portrait mode. However, this is for convenience of description, and the description of FIG. 12 is equally applicable to the opposite case.

According to an embodiment, the electronic device 2000 generates a second image that is to be displayed when the electronic device 2000 is changed from the landscape mode to the portrait mode. To this end, the electronic device 2000 may determine a crop region 1220 to include an object 1210 within a first image 1200. In this case, the electronic device 2000 may select, as the second image, a candidate image obtained by cropping the crop region 1220, and may display the second image in the portrait mode of the electronic device 2000.

According to an embodiment, the electronic device 2000 may determine an enlarged crop region 1230 to further include an extra region of a certain size, based on the object 1210. The electronic device 2000 may select, as the second image, a candidate image obtained by cropping the enlarged crop region 1230 including the extra region, and may display the second image in the portrait mode of the electronic device 2000. In this case, the electronic device 2000 may display the second image including the extra region so that the location of the object 1210 displayed on the screen of the electronic device 2000 moves. This will now be described in greater detail with reference to FIG. 13.

Figure 13:
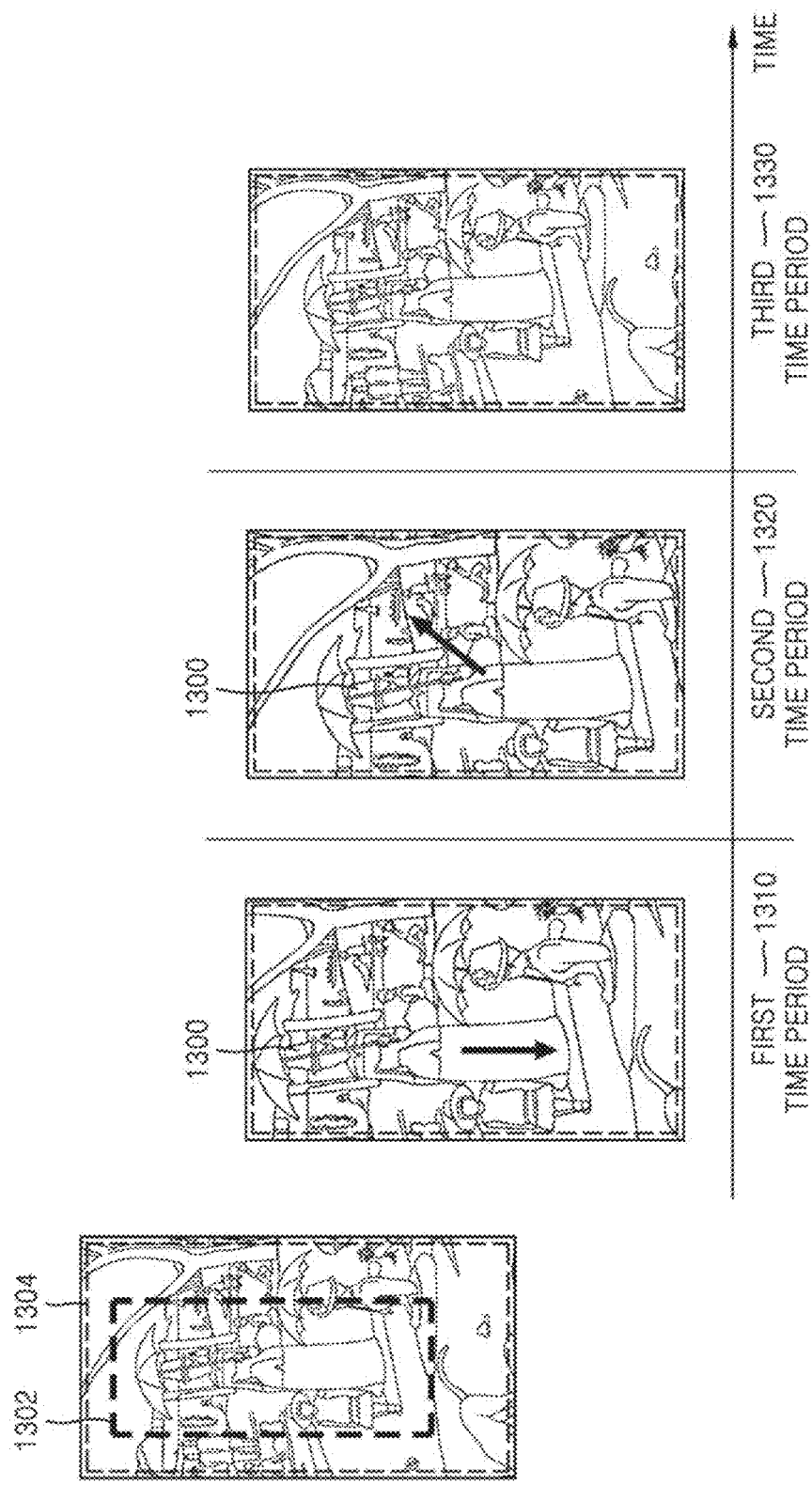
FIG. 13 is a view for explaining an operation of displaying a second image including an extra region, according to an embodiment.

FIG. 13 is a view for explaining an operation, performed by the electronic device 2000 according to an embodiment, of displaying a second image including an extra region.

Referring to FIG. 13, the electronic device 2000 according to an embodiment may determine an enlarged crop region 1304 to further include an extra region of a certain size in addition to a crop region 1302 determined to include an object 1300 as described with respect to FIG. 12.

The electronic device 2000 may determine, as a second image, an image including an extra region, which is obtained by cropping the enlarged crop region 1304.

The electronic device 2000 may display the second image including the extra region so that the location of an object displayed on the screen of the electronic device 2000 moves.

In order to explain a movement of the location of the object displayed on the screen of the electronic device 2000, a time section will be described by being divided into a first time period 1310, a second time period 1320, and a third time period 1330. For example, the electronic device 2000 may display the second image including the extra region so that the location of the object 1300 moves downward during the first time period 1310, by using the second image including the extra region. When the first time period 1320 has elapsed, the electronic device 2000 may display the second image so that the location of the object 1300 moves to the upper right during the second time period 1320. When the second time period 1320 has elapsed, the electronic device 2000 may display the second image so that the location of the object 1300 moves in a different direction during the third time period 1330. In this case, the first time period 1310, the second time period 1320, and the third time period 1330 may all be the same as each other or different from each other.

Figure 14:
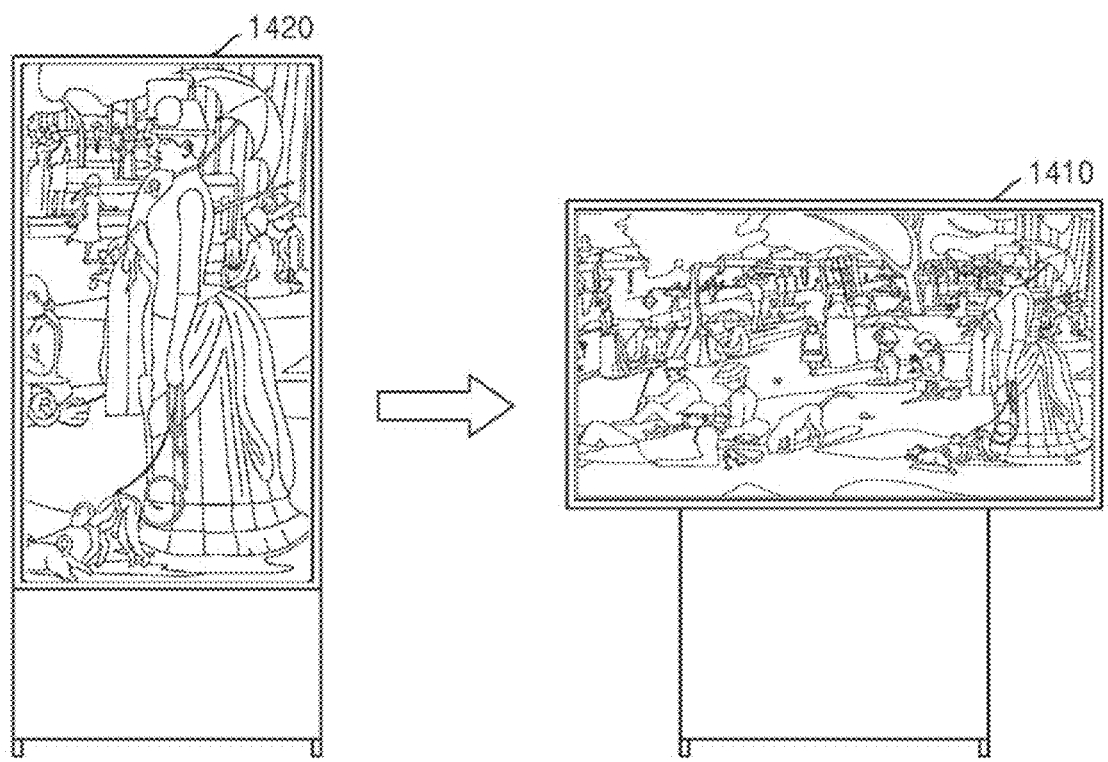
FIG. 14 is a view for explaining an operation of displaying an image when the screen display mode of the electronic device is re-changed, according to an embodiment.

FIG. 14 is a view for explaining an operation, performed by the electronic device 2000 according to an embodiment, of displaying an image when the screen display mode of the electronic device 2000 is re-changed.

According to an embodiment, when the screen display mode of the electronic device 2000 is changed from the landscape mode to the portrait mode, the electronic device 2000 may display a second image 1420 on the screen of the electronic device 2000.

According to an embodiment, the electronic device 2000 may identify whether a display mode of the electronic device 2000 after the second image 1420 is displayed on the screen of the electronic device 2000 is re-changed back to a previous screen display mode.

For example, the electronic device 2000 may identify that the screen display mode of the electronic device 2000 is changed back to the landscape mode, after the second image 1420 is displayed. When the screen display mode of the electronic device 2000 is changed to the landscape mode, the electronic device 2000 may display, on the screen of the electronic device 2000, a first image 1410, which is an image displayed in the landscape mode before the second image 1420 is displayed.

FIG. 15 is a block diagram of the electronic device 2000 according to an embodiment.

Referring to FIG. 15, the electronic device 2000 may include a communication interface 2100, a receiver 2200, a display 2300, a memory 2400, and a processor 2500.

The communication interface 2100 may perform data communication with a server or other electronic devices under a control by the processor 2500. For example, the communication interface 2100 may request for the outside of the electronic device 2000 for an image, video, audio, etc., and may receive the image, video, audio, etc.

The communication interface 2100 may perform data communication with the server or the other electronic devices by using at least one of data communication methods including, for example, a wired LAN, a wireless LAN, Wi-Fi, Bluetooth, Zigbee, Wi-Fi Direct (WFD), infrared communication (IrDA), Bluetooth Low Energy (BLE), Near Field Communication (NFC), Wireless Broadband Internet (Wibro), World Interoperability for Microwave Access (WiMAX), a shared wireless access protocol (SWAP), Wireless Gigabit Alliance (WiGig), and/or RF communication.

The receiver 2200 may receive the image, video, audio, etc. from the outside of the electronic device 2000 under the control by the processor 2500.

The receiver 2200 may include at least one of, for example, a High-Definition Multimedia Interface (HDMI) port, a component jack, a PC port, a display port, or a USB port.

The display 2300 may output an image signal to the screen of the electronic device 2000 under the control by the processor 2500.

Instructions, a data structure, and program code readable by the processor 2500 may be stored in the memory 2400. According to an embodiment, operations performed by the processor 2500 may be implemented by executing the instructions or codes of a program stored in the memory 2400.

The memory 2400 may include at least one of a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, or an optical disk (.

The memory 2400 according to an embodiment may store one or more instructions or programs that cause the electronic device 2000 to adaptively display an image. For example, the memory 2400 may store a device analysis module 2410, an object detection module 2420, and an image processing module 2430.

The processor 2500 may control overall operations of the electronic device 2000. For example, the processor 2500 may control overall operations of the electronic device 200 to adaptively display an image, by executing the one or more instructions of the program stored in the memory 2400. The processor 2500 may include one or more neural network processors for detecting an object from an image.

The processor 2500 may include, but is not limited to, at least one of a central processing unit, a microprocessor, a graphics processing unit, application specific integrated circuits (ASICs), digital signal processors (DSPs), digital signal processing devices (DSPDs), programmable logic devices (PLDs), field programmable gate arrays (FPGAs), an application processor, a neural processing unit, or an AI dedicated processor designed with a hardware structure specialized for processing an AI model.

According to an embodiment, the processor 2500 may execute the device analysis module 2410 to analyze related information of the electronic device 2000. The processor 2500 may identify whether the screen display mode of the electronic device 2000 is changed. In this case, the processor 2500 may identify whether the screen display mode of the electronic device 2000 is changed, based on sensor information sensed by one or more sensors (e.g., a gyro sensor). The processor 2500 may identify information related to the specifications of the electronic device 2000 (e.g., the resolution, the screen aspect ratio, etc. of the display 2300 of the electronic device 2000). When the screen display mode of the electronic device 2000 is changed and an image before the screen display mode is changed is displayed in a changed screen display mode, the processor 2500 may identify whether a blank exists on the screen of the electronic device 2000. Because operations performed by the processor 2500 by using the device analysis module 2410 have already been described above, repeated description will be omitted for conciseness.

According to an embodiment, the processor 2500 may execute the object detection module 2420 to detect one or more objects from an image. The processor 2500 may identify the type and location of the object existing in the image by using an AI model. In this case, the processor 2500 may generate an ROI map indicating ROIs in the image, and may detect the one or more objects from the image, based on the ROI map. Because operations performed by the processor 2500 by using the object detection module 2420 have already been described above, repeated description will be omitted for conciseness.

According to an embodiment, the processor 2500 may perform various image processing by executing the image processing module 2430. The processor 2500 may determine a region including an object as a crop region, with respect to the one or more objects detected from the image. The processor 2500 may generate a plurality of candidate images by cropping the image, based on the determined crop region. In order to display a second image selected from the plurality of candidate images on the screen of the electronic device 2000, the processor 2500 may adjust the size of the second image and may improve the resolution. Because operations performed by the processor 2500 by using the image processing module 2430 have already been described above, repeated description will be omitted for conciseness.

An operation method of an electronic device according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for the disclosure or may be well-known to and usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are high-level language codes that can be executed by a computer by using an interpreter or the like as well as machine language codes made by a compiler. The computer-readable recording medium may be provided as a non-transitory recording medium. The non-transitory recording medium is a tangible device, and only means that it does not contain a signal (e.g., electromagnetic waves). This term does not distinguish a case in which data is stored semi-permanently in a recording medium from a case in which data is temporarily stored. For example, the non-transitory recording medium may include a buffer in which data is temporarily stored.

The operation method of an electronic device, according to embodiment, may be provided by being included in a computer program product. The computer program product, which is a commodity, may be traded between sellers and buyers.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market. For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. In some embodiments, when there is a third device (e.g., a smartphone) in communication with the server or client device, the computer program product may include a storage medium of the third device. In some embodiments, the computer program product may include the software program itself transmitted from the server to the client device or the third device, or transmitted from the third device to the client device.

In this case, one of the server, the client device, and the third device may execute the computer program product to perform the methods according to the disclosed embodiment. In some embodiments, at least two of the server, the client device, and the third device may execute the computer program product to distribute and perform the methods according to the disclosed embodiment.

For example, a server (e.g., a cloud server or an artificial intelligence server) may execute a computer program product stored on a server to control a client device communicating with the server to perform the methods described above with respect to FIGS. 1-14.

While one or more embodiments have been described with reference to the figures, it will be understood by those of ordinary skill in the art that various changes in form and details may be made therein without departing from the spirit and scope as defined by the following claims.

What is claimed is:

1. A method, performed by an electronic device, the method comprising:
    identifying that a screen display mode of the electronic device currently displaying a first image is changed from a first display mode to a second display mode, the screen display mode being one of a landscape mode and a portrait mode;

identifying, based on pixel data, whether a blank exists on a screen of the electronic device, when the first image is displayed in the second display mode while still corresponding to an aspect ratio of the first display mode and with an adjusted size;

based on identifying the blank exists, detecting a plurality of objects from the first image;

identifying aspect ratios of the plurality of objects detected from the first image;

determining, crop regions for only matching objects of the plurality of objects whose aspect ratios match an aspect ratio of the second display mode;

generating a plurality of candidate images by cropping the determined crop regions; selecting a second image from the plurality of candidate images; and displaying the second image so that the blank does not exist on the screen of the electronic device in the second display mode.

2. The method of claim 1, wherein:
selecting the second image comprises selecting a plurality of second images from the plurality of candidate images, and
displaying the second image comprises displaying a combination of a portion of the plurality of second images.

3. The method of claim 1, wherein:
selecting the second image comprises selecting a plurality of second images from the plurality of candidate images, and
displaying the second image comprises sequentially displaying the plurality of second images.

4. The method of claim 1, further comprising adjusting a size of the second image and increasing a resolution of the second image.

5. The method of claim 1, wherein detecting the plurality of objects from the first image comprises:
generating a region of interest (ROI) map that indicates ROIs within the first image; and
recognizing the plurality of objects, based on the ROI map.

6. The method of claim 5, further comprising classifying the plurality of objects into a main object and one or more sub-objects,
wherein selecting the second image comprises selecting a candidate image of the plurality of candidate images that includes the main object as the second image.

7. The method of claim 1, wherein generating the plurality of candidate images comprises cropping the determined crop regions so that an aspect ratio of the determined crop regions that is cropped is a certain ratio, based on specifications of the electronic device.

8. The method of claim 1, wherein the determined cropped regions that are cropped are determined based on one or more of a location of an object within the first image, a number of objects within the first image, and a presence or absence of the object with the first image.

9. The method of claim 8, wherein:
determining the crop regions that are cropped comprises determining an enlarged crop region that further includes an extra region of a certain size, and
displaying the second image comprises displaying the second image including the extra region so that a location of the object displayed on the screen of the electronic device moves.

10. The method of claim 1, further comprising displaying the first image on the screen of the electronic device, when the screen display mode of the electronic device is changed back to the first display mode after the second image is displayed.

11. An electronic device comprising:
a display;
one or more sensors;
a memory that stores one or more instructions; and
a processor configured to execute the one or more instructions that are stored in the memory to cause the processor to at least:
identify that a screen display mode of the electronic device currently displaying a first image is changed from a first display mode to a second display mode, the screen display mode being one of a landscape mode and a portrait mode;
identify, based on pixel data, whether a blank exists on a screen of the electronic device, when the first image is displayed in the second display mode while still corresponding to an aspect ratio of the first display mode and with an adjusted size;
based on identifying that the blank exists, detect a plurality of objects from the first image;
identify aspect ratios of the plurality of objects detected from the first image;
determine crop regions for only matching objects of the plurality of objects whose aspect ratios match an aspect ratio of the second display mode;
generate a plurality of candidate images by cropping the determined crop regions;
select a second image from the plurality of candidate images; and
display the second image so that the blank does not exist on the screen of the electronic device in the second display mode.

12. The electronic device of claim 11, wherein the processor is further configured to execute the one or more instructions to cause the processor to:
select a plurality of second images from the plurality of candidate images; and
display a combination of a portion of the plurality of second images.

13. The electronic device of claim 11, wherein the processor is further configured to execute the one or more instructions to cause the processor to:
select a plurality of second images from the plurality of candidate images; and
sequentially display the plurality of second images.

14. The electronic device of claim 11, wherein the processor is further configured to execute the one or more instructions to cause the processor to adjust a size of the second image and increase a resolution of the second image.

15. The electronic device of claim 11, wherein the processor is further configured to execute the one or more instructions to cause the processor to:
generate a region of interest (ROI) map that indicates ROIs within the first image; and
recognize the plurality of objects, based on the ROI map.

16. The electronic device of claim 15, wherein the processor is further configured to execute the one or more instructions to cause the processor to:
classify the plurality of objects into a main object and one or more sub-objects; and
select, as the second image, a candidate image of the plurality of candidate images that includes the main object.

17. The electronic device of claim 11, wherein the processor is further configured to execute the one or more instructions to cause the processor to crop the determined crop regions so that an aspect ratio of the determined crop regions is a certain ratio, based on specifications of the electronic device.

18. The electronic device of claim 11, wherein the determined crop regions that are cropped are determined based on one or more of a location of an object within the first image, a number of objects within the first image, and a presence or absence of the object with the first image.

19. The electronic device of claim 18, wherein the processor is further configured to execute the one or more instructions to cause the processor to:
   determine an enlarged crop region that includes an extra region of a certain size; and
   display the second image including the extra region so that a location of the object displayed on the screen of the electronic device moves.

20. A non-transitory computer-readable recording medium having recorded thereon a program which, when executed by an electronic device, causes the electronic device to execute a method comprising:
   identifying that a screen display mode of the electronic device currently displaying a first image is changed from a first display mode to a second display mode, the screen display mode being one of a landscape mode and a portrait mode;
   identifying, based on pixel data, whether a blank exists on a screen of the electronic device, when the first image is displayed in the second display mode while still maintaining an aspect ratio of the first display mode and with an adjusted size;
   based on identifying the blank exists, detecting a plurality of objects from the first image;
   identifying aspect ratios of the plurality of objects detected from the first image;
   determining crop regions for only matching objects of the plurality of objects whose aspect ratios match an aspect ratio of the second display mode;
   generating a plurality of candidate images by cropping the determined crop regions;
   selecting a second image from the plurality of candidate images; and
   displaying the second image so that the blank does not exist on the screen of the electronic device in the second display mode.

* * * * *